United States Patent [19]
Murphy et al.

[11] Patent Number: 5,955,987
[45] Date of Patent: Sep. 21, 1999

[54] HYBRID RADIO FREQUENCY SYSTEM WITH DISTRIBUTED ANTI-JAM CAPABILITIES FOR NAVIGATION USE

[75] Inventors: John H. Murphy, Pittsburgh, Pa.; Robert S. Littlepage, Baltimore, Md.

[73] Assignee: Northrop Grumman Corporation, Los Angeles, Calif.

[21] Appl. No.: 08/789,771

[22] Filed: Jan. 28, 1997

[51] Int. Cl.[6] .............................. H04B 7/185; G01S 5/02
[52] U.S. Cl. ..................... 342/357.06; 342/16; 701/213
[58] Field of Search ..................... 342/357, 378, 342/379, 16, 357.06; 701/213

[56] References Cited

U.S. PATENT DOCUMENTS

| | | | |
|---|---|---|---|
| 4,734,701 | 3/1988 | Grobert | 342/380 |
| 5,317,322 | 5/1994 | Grobert | 342/378 |
| 5,410,750 | 4/1995 | Cantwell et al. | 455/306 |
| 5,489,869 | 2/1996 | Mulbrook | 327/356 |
| 5,543,804 | 8/1996 | Buchler et al. | 342/357 |

Primary Examiner—Theodore M. Blum

[57] ABSTRACT

A radio frequency navigation receiver has analog and digital sections. In the analog section, a CRPA antenna module receives global navigation signals and provides two steerable nulls for jammer suppression. An analog RF module has an amplifier and a YIG filter for amplifying and filtering an antenna output signal with jammer suppression. An analog receiver receives and downconverts an RF output signal from the RF system with additional jammer suppression. The analog receiver provides broadband signal filtering with at least 30 dB rejection and narrow band signal filtering with at least 45 dB rejection.

In the digital section, a digital receiver module receives and converts an analog receiver output signal to generate a digital output signal for navigation control. A configuration manager processor responds to detected jammer signals to configure the receiver modules accordingly.

56 Claims, 17 Drawing Sheets

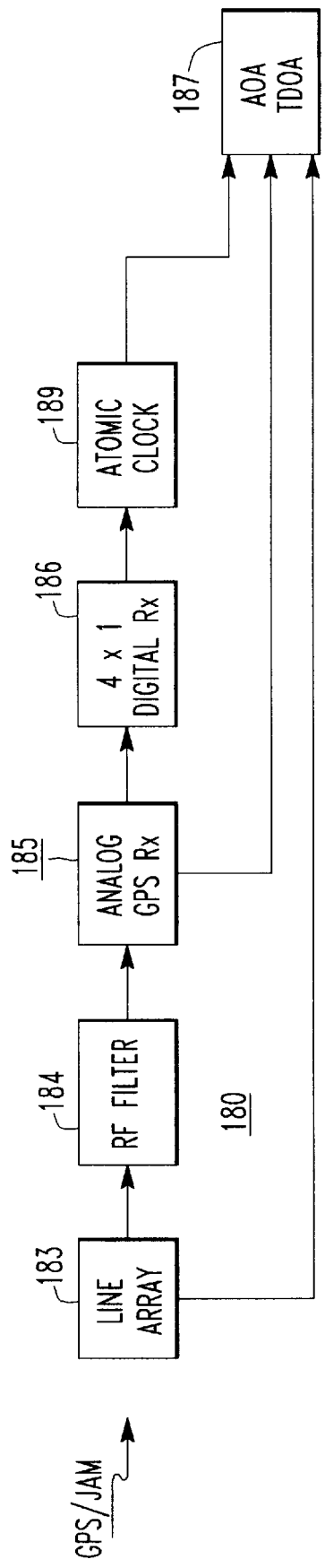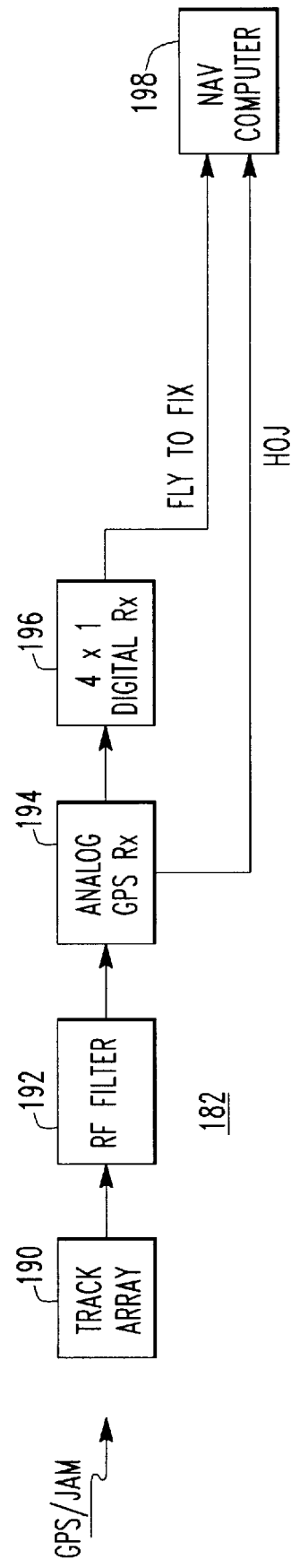

HYBRID RADIO FREQUENCY SYSTEM WITH DISTRIBUTED ANTI-JAM CAPABILITIES FOR NAVIGATION USE

BACKGROUND OF THE INVENTION

The present invention relates to radio frequency (RF) systems used for navigational purposes, and, more particularly, to RF receivers which operate in satellite navigation systems and are structured with diverse anti-jam capabilities to enable receiver and navigation operations in a hostile jammer environment.

Satellite navigation systems employ a plurality of satellites which generate respective signals for reception by an RF receiver on an airborne or surface vehicle or other platform for computation of the platform position. A navigation control can thus steer the platform in its motion on the basis of a stream of position calculations. The United States and Russia recently deployed satellite RF navigation systems respectively called the Global Positioning System (GPS) and Global Navigation Satellite System (GLONASS). For a detailed description of these navigation systems, reference is made to a book entitled "Understanding GPS: Principles and Application", edited by E. D. Kaplan, and published in 1996 by Artech House Publishers of Boston, Mass.

In this disclosure, the term GPS refers generically to satellite navigation systems including the Global Position System, GLONASS, and any additional satellite navigation system which may be created in the future such as the system planned by the European Community.

The satellite navigation systems, now deployed, were developed with civilian access built into the signal structure, and these systems are thus highly vulnerable to electronic attack measures. The same is likely to be true for any future navigation system.

To date, the United States government has examined a number of techniques for ensuring RF navigation in a jamming environment. These anti-jam techniques have been independently developed with little or no strategic plan as to how, when, or where these various techniques may be used. Table 1 provides an overview of capabilities and usage of existing RF navigation related anti-jam technologies.

TABLE 1

OFF-THE-SHELF ANTI-JAM CAPABILITIES

| Anti-Jam Technology | Typical Anti-Jam Capability | Use | Where |
|---|---|---|---|
| Antennas with Choke Rings | — | Multipath Mitigation | Antenna |
| Upwards Looking Antennas | 30 to 60 dB | Eliminate Ground Level Jammers | Antenna |
| Fixed Reception Pattern Antenna (FRPA) | 25 to 35 dB Fixed Nulls | Fixed Jammers | Antenna |
| Controlled Reception Pattern Antenna (CRPA) | 25 to 35 dB Steerable Nulls | Mobile Jammers | Antenna |
| Cavity Filters or Bandpass Pre-filters | — | Eliminate Out-of-band Interference | Pre-Filtering |
| Notch Filters | 20 to 30 dB | CW Jamming | RF Filtering |
| Transversal Filters | 20 dB (PSK) to 30 dB (CW) | CW & PSK Jamming | IF Filtering |
| Jammer-to-Noise Power Ratio Meters | — | Detect Jammers | Digital Receiver |
| Non-linear A/D Converters | — | Limit Interference | Digital Receiver |
| Wider Dynamic Range A/D Converters | ~6 dB per Bit | Any Jammers | Digital Receiver |
| Anti-Spoofing (A-S) encrypted Y-code | — | Limit Access to P-code | Digital Receiver |
| INS Aiding of Code/Carrier Loops | ~20 dB | Coasting through Jamming Signals | Digital Receiver |
| Parallel Correlators | — | Direct Y-code Acquisition | Digital Receiver |

Even in a jammer-free and interference-free environment, the navigational accuracy of existing military RF receivers is inadequate for certain weapon-platforms. For example, such RF receivers may produce unacceptable vertical position errors in weapon delivery. A need thus exists for a GPS receiver which provides greater navigational accuracy.

In an RF environment, interference signals may have jamming effects on an RF receiver even though they are not intentionally generated as jamming signals by combatants in a military environment or by terrorists in a civil or commercial environment. Jamming interference signals may originate, for example, in a laptop computer on an airplane, a radio or television tower, or any high frequency device such as a radar, a radio, or a cellular phone.

Accordingly, the term "jammer signal" herein refers to both jammer and interference signals. In illustration, the term "jammer free" includes "interference-free", and the term "anti-jam capability" includes "anti-interference" capability.

With the removal of selective availability, the use of various forms of jamming can provide a means for maintaining an edge in RF navigation in theaters of war. In turn, the use of electronic attack (jamming) against the use of GPS navigation technology leads to a need for electronic protection (anti-jam technology) which enables use of the RF navigation technology in a jamming environment.

In state-of-the-art GPS receivers having anti-jam capability, the magnitude of jammer suppression has been limited by limited anti-jam capabilities. Moreover, existing design concepts have typically limited the kinds of jammers which can be suppressed in such GPS receivers. It is desirable that a basic GPS receiver structure be developed to provide better jammer suppression and to provide suppression of a wide range of different kinds of jammers. Further, a need exists for GPS receiver structures used in a variety of platforms, such as airplanes, land vehicles, cruise missiles or smart munitions, manportable units, ordinary munitions, etc. Accordingly, a wide variety of anti-jam requirements exists for the wide range of possible applications.

With previously known GPS anti-jam receivers, this variety of requirements can be met only by a costly proliferation of GPS designs for the different platform applications. It is thus desirable that a basic GPS receiver structure be developed to enable anti-jam capabilities to be provided cost effectively over a wide range of platform applications.

In one particular aspect of state-of-the-art GPS receivers, an analog/digital interface is placed as close as possible to the GPS receiver antenna to obtain an anti-jam capability principally through digital circuitry functioning with or without antenna nulling. This prior art analog/digital design concept has actually limited anti-jam capabilities in GPS receivers, as more fully explained subsequently hereinafter, and typically has employed a multitude of deep antenna nulls which can be substantially reduced in effectiveness by "toggling" jammers operating to confuse the anti-jamming operation of the deep nulls.

Other prior art RF systems, such as Electronic Support Measures (ESM) and anti-radiation missile seekers (ARM) used for navigation and targeting purposes have also been limited in performance similar to the described limitations of prior art GPS RF receivers.

Accordingly, the present invention is directed to meeting existing needs in the pertaining art and to overcoming the described prior art limitations.

SUMMARY OF THE INVENTION

A radio frequency (RF) navigation receiver, usable in military and commercial mobile platforms, is thus structured to comprise an analog section which includes an antenna system for receiving global navigation signals and an analog RF system having an amplifier and preferably a filter for amplifying and filtering an antenna output signal which includes the navigation signals and any received jammer signals.

Further, an analog receiver receives and downconverts an RF output signal from the analog RF system.

In a digital system of the receiver, a digital receiver system receives and converts an analog receiver output signal to generate a digital output signal for navigation control.

In one aspect of the invention the analog receiver preferably has means for filtering by adaptive cancellation to provide a first capability for suppressing received jammer signals. The adaptive cancellation filtering is preferably performed for broadband signals with at least 30 dB rejection and/or for narrow band signals with at least 45 dB rejection. At least one of the digital receiver, the antenna system, and the RF system preferably has means for suppressing received jammer signals to provide a second jammer suppression capability, or the second and additional jammer suppression capabilities.

In another aspect of the invention, the analog RF system employs an adaptive filter, which provides a first means for suppressing received jammer signals, and the antenna system and/or the analog receiver and/or the digital receiver may selectively include one or more additional jammer signal suppressing means.

Accordingly, the invention enables GPS and other RF navigation receivers to be structured flexibly, and preferably modularly, to provide improved anti-jam capability suitable for the use to which each receiver is to be applied.

BRIEF DESCRIPTION OF THE DRAWINGS

The accompanying drawings, which are incorporated in and constitute a part of the specification, illustrate a preferred embodiment of the invention and, together with the description, provide an explanation of the objects, advantages, and principles of the invention. In the drawings:

FIG. 15 shows a block diagram of a modular targeting system embodied in accordance with the invention to provide electronic support measures (ESM); and FIG. 16 shows a block diagram of still another modular targeting and navigation system embodied in accordance with the invention to provide anti-radiation missile seeking (ARM).

DESCRIPTION OF THE INVENTION

Figure 1A:
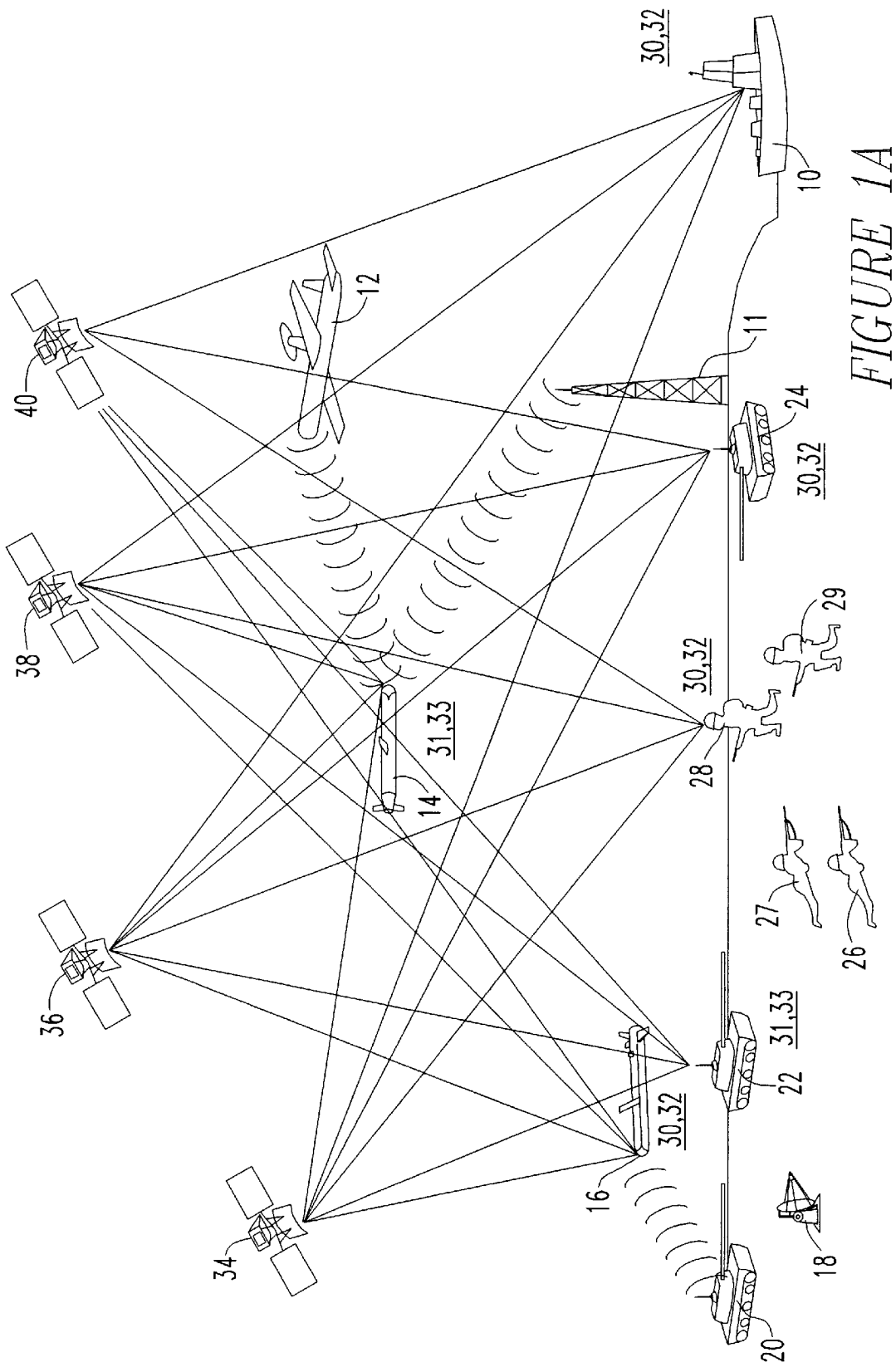
FIG. 1A illustrates a navigation environment in which a navigable platform employs radio frequency (RF) satellite signals for global navigation in the presence of jammer signals.

The present invention is directed to RF systems in which jammer suppression and navigation signal enhancement technologies are employed in a manner which generally provides better, more reliable RF system performance in military navigation and targeting applications and commercial navigation applications, while specifically enabling such RF systems to be flexibly and economically configured with specified performance.

The invention generally employs distributed, and preferably modularly distributed, jammer suppression and navigation signal enhancement in an RF system which is provided at the system level with a hybrid analog/digital architecture. In application of the invention to GPS RF receivers, a diversity of anti-jam (AJ) technologies can be employed to defeat, with greater effectiveness, a wide variety of jammer threat configurations (number, disposition, power, and modulation) that might otherwise jam the use of navigation to be provided with use of GPS receivers.

In accordance with the invention, an AJ GPS receiver is preferably organized into six modules which can be combined in different ways to enable AJ GPS receiver products to be configured with different levels of AJ performance according to specified needs.

A first module is a receiver antenna module which preferably incorporates a distributed upwardly directed antenna array enabling nulls to be steered against possible jammers in an upper hemisphere of coverage.

A second module is a receiver protector preferably embodied as a PIN diode switch or a similar type of device which protects sensitive electronics from high power microwave jamming which might be used to try to disable the GPS receiver.

A third module is an adaptive RF filter based on YIG filter technology. If desired, the receiver protector and the adaptive RF filter may be combined in a single module.

A fourth module is an analog receiver which contains two types of adaptive IF filters (continuous look-through filters) for suppressing broad band spread spectrum and narrow band CW jamming signals while having little impact on a GPS signal.

A fifth module is a miniature, low power clock which provides an atomic time standard. The atomic clock module provides a highly stable frequency source for maintaining absolute time and for generating low phase noise clock signals throughout the GPS receiver. By closely coupling the atomic clock within the GPS receiver, the AJ GPS receiver is capable of: (1) achieving on average factor of three improvement in vertical positioning, (2) achieving on average a 10% improvement in horizontal positioning, (3) performing direct Y-code acquisition orders of magnitude faster with a small number of correlators, and (4) improving the AJ capability by typically two orders of magnitude through reduction in the time and frequency uncertainty in searching for the satellite signals.

Finally, a sixth module is a digital GPS receiver. In this module, AJ capability is preferably provided through: (1) increased dynamic range provided by higher precision A/D conversion, and (2) increased processing gain through parallel processing provided by numerous digital correlators.

The hybrid organization of the invention significantly contributes to its described benefits. The modular structure of the invention enables a GPS receiver to be economically configured for the level of performance needed in a military or commercial platform in which the GPS receiver is to be applied. Such military or commercial platforms may include, for example, ground-based vehicles, ships, missiles, and airplanes.

The modular structure for an AJ GPS receiver allows a family of GPS receivers to be designed with a variety of levels of AJ capability ranging from as low as 25 dB to over 120 dB. From the six described basic modules, low cost, AJ GPS receivers can be tailored for munitions and man-portable applications; moderate cost, AJ GPS receivers can be made for expendable UAVs, cruise missiles, land vehicles, and smart munitions; and high cost, AJ GPS receivers can be made for aircraft, surface vessels, complex UAVs, and satellites.

More particularly, FIG. 1A is a schematic representation of a hostile environment in which RF navigation is to be performed by blue forces using the principles of the invention for a plurality of platforms 30, each to be navigated with use of a GPS RF receiver 32. Typical platforms are indicated by text and associated icons. Red forces use a plurality of platforms 31 navigated by respective conventional GPS RF receivers 33.

Current satellite navigation systems typically employ twenty-four satellites with up to eleven satellites being in sight of a terrestrially-based navigable platform, but only four satellites 34, 36, 38, and 39 are shown since a minimum of four satellite signals are required for navigation computations. A plurality of blue and red aerial and/or surface jammers 11, 12 (blue) and 20 (red) generate signals intended to penetrate the indicated red and blue GPS receivers 32, 33 and interfere with navigation of the associated red and blue 30, 31 platforms.

Figure 1B:
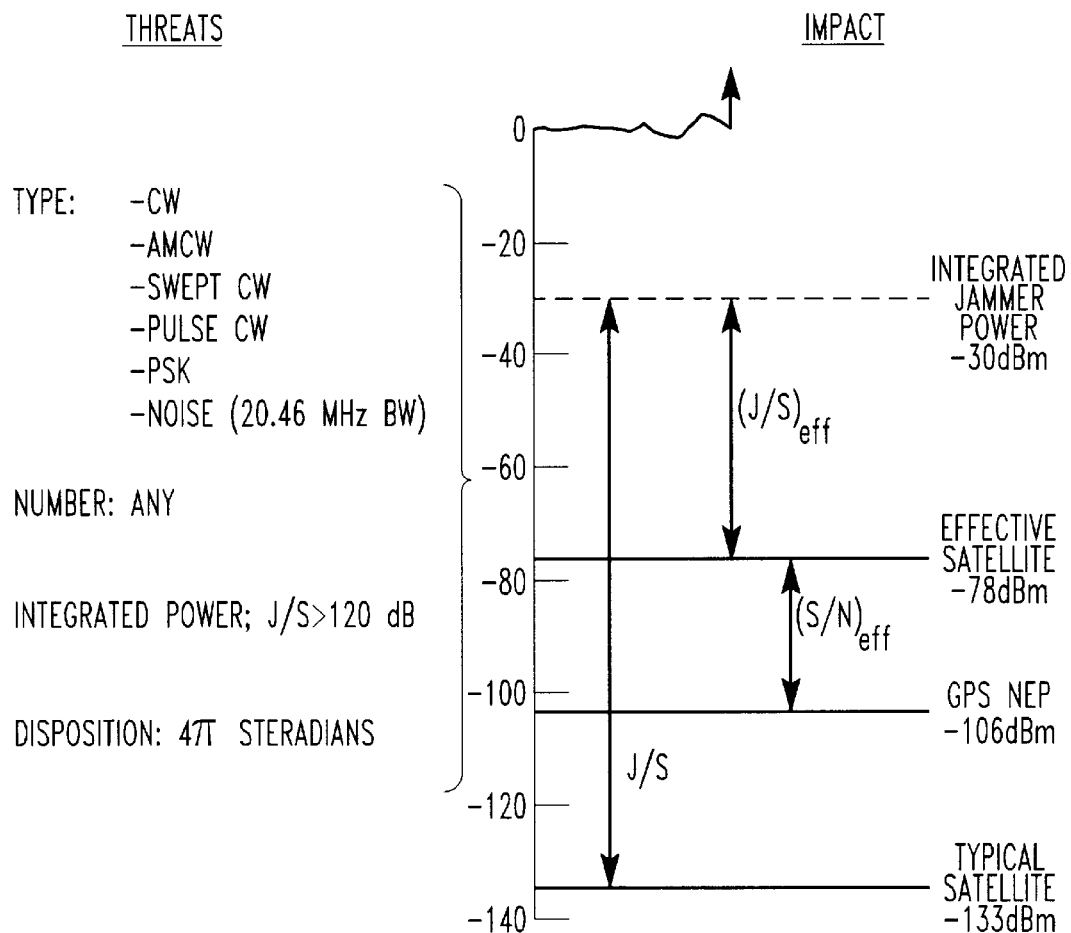
FIG. 1B is a diagram which shows the impact of various kinds of jammer threats in the environment of FIG. 1A.
Figure 1C:
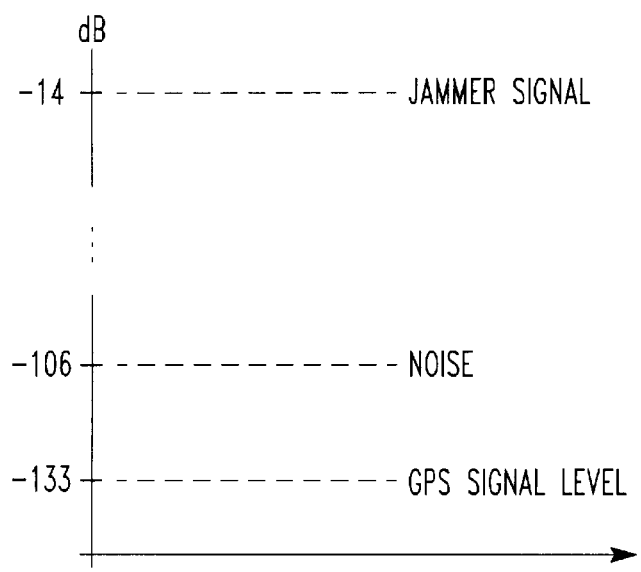
FIG. 1C graphically illustrates the relationship among RF satellite, jammer, and noise signals.

As shown in FIG. 1C, the amplitude of GPS satellite signals (such as −133 dB) is below the ambient noise amplitude (such as −106 dB). The satellite signals are thus difficult to find for direct jamming purposes, but can be identified by a GPS receiver through signal correlation techniques based on knowledge of the pattern of the satellite signals. Such identification is made possible when jammer signals, such as the one shown at −14 dB, are adequately suppressed.

A combined land, sea, and air engagement is shown in FIG. 1A wherein various forces are attempting to use RF signals from the satellites 34, 36, 38, and 39 to navigate within a battlefield. The battlefield area is being actively jammed by the stand-off jammers 11, the airborne jammers 12 and the land mobile jammers 20. Blue forces are using RF navigation signals to guide cruise missiles 16 into targets such as ground radars 18. Likewise, red forces are trying to eliminate blue assets such as ships 10 and are using C/A code receivers to guide their missiles 14 into the targets. The greatest benefit of RF navigation, to the blue forces, is reduced fratricide resulting from accurate placement of blue troops 28 and 29 and assets such as tanks 20, 24 on a desert or other featureless battlefield. A red tank 22 and red troops 26, 27 are also shown. The forces with better tools for operating in this hostile RF environment will have a better chance of survival and greater likelihood of success.

FIG. 1B depicts threats which an AJ GPS receiver is likely to face and the impact of such threats on signal processing.

A robust AJ GPS receiver must be designed to withstand six major types of threats: CW (narrow band, fixed frequency continuous waveforms), AMCW (amplitude modulated narrow band, fixed frequency continuous waveforms), Swept CW (narrow band, swept frequency continuous waveforms), Pulse CW (pulsed power, narrow band, fixed frequency continuous waveforms), PSK (phase shift keyed, broad band [20.46 MHz bandwidth] waveforms) and Noise (broad band [20.46 MHz bandwidth] Guassian [and near Guassian] white noise). Any number of these threats may occur in any combination.

The maximum anticipated threat environment in which the GPS receiver is to operate is one in which integrated power levels or jammer to satellite signal (J/S) levels are greater than 120 dB. The threats can be located anywhere in space; that is, the threat disposition is 4 pi steradians. The example illustrated on the right-hand side of FIG. 1B is based on an environment with an integrated power level of 103 dB, i.e., an integrated jammer power of −30 dBm. The typical satellite signal level is −133 dBm which is 27 dB below the noise floor (−106 dBm) of a typical GPS receiver.

Since the GPS receiver is processing a spread spectrum signal for which the spreading function is known, receiver correlators are able to provide processing gain on the order of 55 dB which means that an effective satellite signal (post-processing) is on the order of 28 dB above the noise floor (−78 dBm). The GPS receiver only needs to remove jammer signals above the effective satellite signal level, and, therefore, the effective jammer to signal level $(J/S)_{eff}$ is usually much smaller (48 dB) than the integrated power level (103 dB) as shown in FIG. 1B.

Figure 2A:
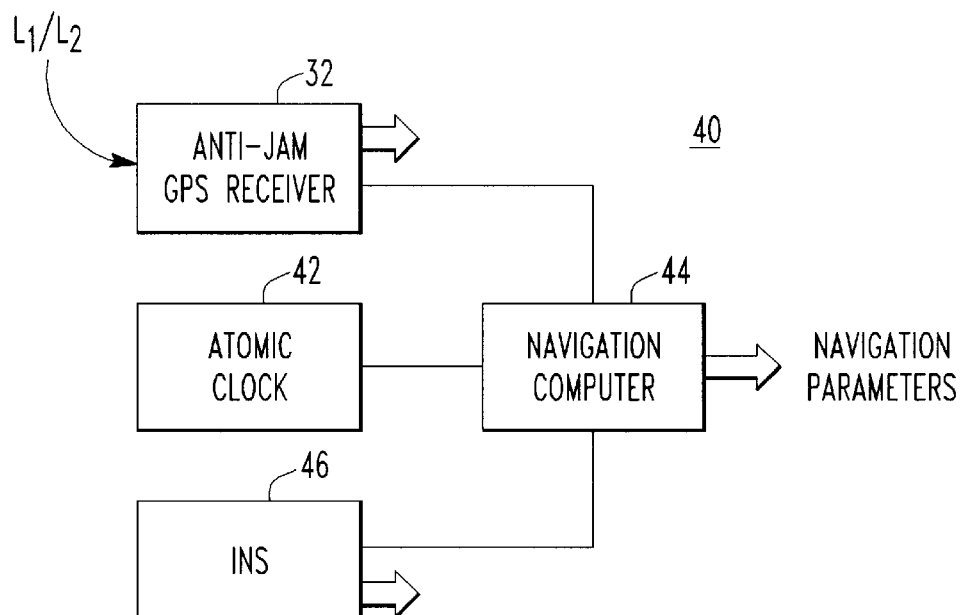
FIG. 2A is a block diagram of a navigation system embodied in accordance with the invention.

As shown in FIG. 2A, a GPS navigation system 40 implements the invention with the AJ GPS receiver 32 of FIG. 1A, and, in higher performance systems, an atomic clock 42. A navigation computer 44 operates on inputs from the GPS receiver 32, the atomic clock 42, and an inertial navigation system (INS) 46 to generate navigation parameters, such as location, velocity, time, attitude, and acceleration.

Figure 2B:
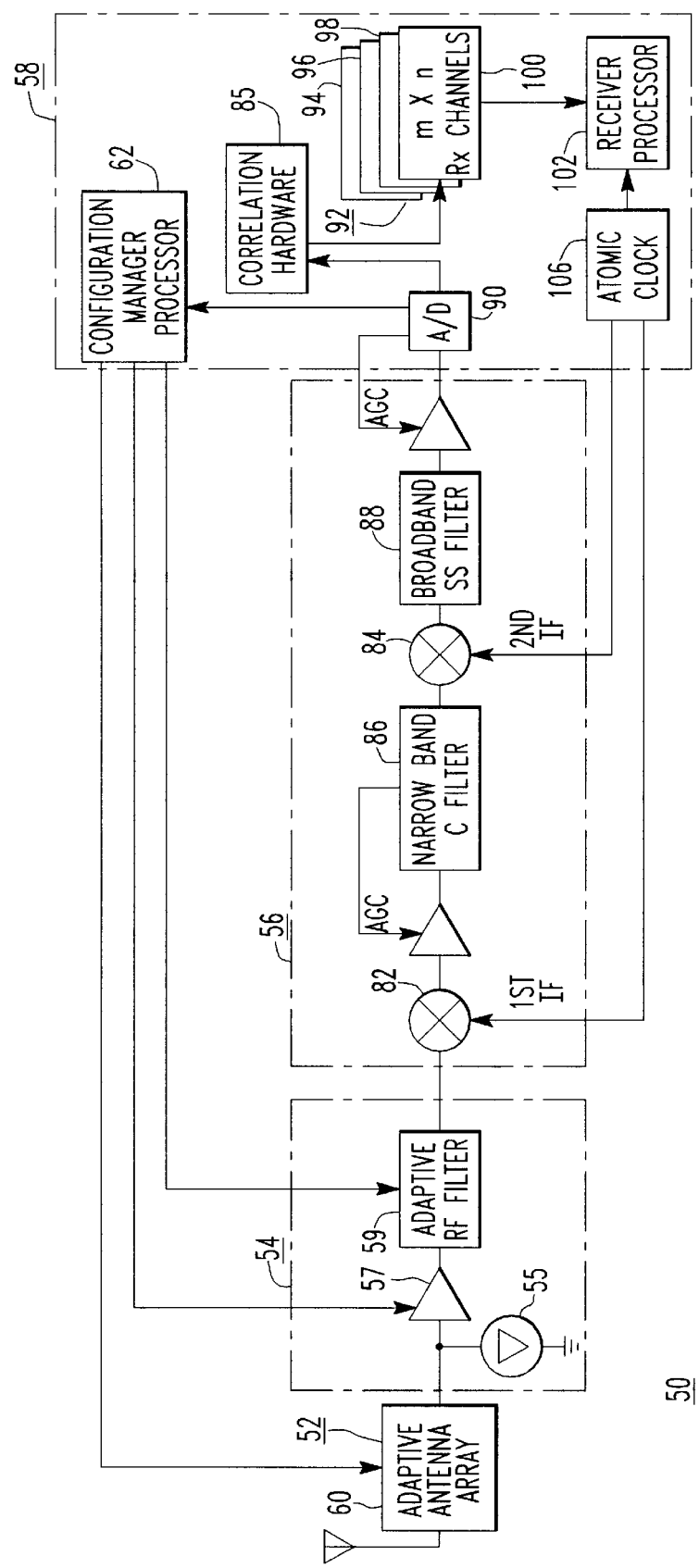
FIG. 2B shows in greater detail a block diagram of an RF GPS receiver employed in the navigation system of FIG. 2A, and having a preferred system-level, analog/digital hybrid structure with modularly distributed anti-jam capabilities.

A GPS RF receiver 50, illustrated in FIG. 2B, is an embodiment of the invention which is hybridized at the system level and preferably modularly structured to provide high level navigation signal enhancement and AJ capacity for improved GPS navigation. The GPS receiver 50 has a modular structure including an AJ antenna module 52, an AJ RF module 54, an AJ analog receiver module 56, and a digital receiver module 58 with distributed AJ and signal enhancement capabilities which enable improved GPS receiver performance in navigation operations.

In designing a particular GPS receiver, the modular structure of the invention enables a large variety of GPS receivers to be configured with an AJ capability needed for each GPS receiver design. As more fully considered subsequently herein, use of all modules provides maximum GPS receiver accuracy and greatest jammer suppression. In contrast, use of only the RF module 54, with jammer suppression filtering, the analog receiver module 56, without jammer suppression filtering, and the digital receiver module 58 (four-channel) provides specified jammer suppression in a low cost/low prime power GPS receiver.

With the RF filter module used to provide a core jammer suppression capability, one or more additional modules can selectively have additional jammer suppression capability (capabilities) thereby enabling a variety of RF receivers to be configured economically to meet a variety of user AJ needs with improved performance.

In another aspect of the invention, the analog receiver module can have a core jammer suppression capability with one or more other modules selectively providing additional jammer suppression enabling a variety of improved RF receivers to be configured according to user AJ needs.

In the GPS receiver 50, the system analog/digital interface is located between the analog and digital receiver modules 56 and 58. In this manner, advanced AJ capability is enabled through effective analog filtering in the analog receiver module 56.

Generally, the antenna module 52 is capable of rejecting, by 25 dB or more, all signals originating below a horizontal plane through the GPS receiver platform, and is additionally preferably capable of generating two 25 dB deep steerable nulls which can be pointed in any direction above the horizontal plane.

As previously indicated, conventional antenna arrays (CRPA) employ multiple steerable nulls intended to achieve most or all of the jammer suppression capability of the conventional GPS receiver. Such antennas employ attenuators, phase shifters, and variable controlled amplifiers to provide phase and amplitude control for steering nulls toward jammers. Typical CRPA arrays having six steerable nulls are large, expensive, and as subsequently explained, generally have a poor return on investment.

Blinking or terrain bouncing of signals can easily defeat jammer suppression in the conventional GPS receiver design with CRPA antenna based AJ. Further, conventional GPS receiver design cannot apply jammer suppression using expensive CRPA antennas to man-portable receivers.

The AJ antenna module 52 may be omitted from the GPS receiver 50 and replaced by a conventional antenna, but it is included when higher level GPS receiver performance is specified. The module 52 employs an adaptive array antenna 60 (typically illustrated in FIG. 3C) which is an upwardly directed analog apparatus classifiable as a controlled reception pattern antenna (CRPA). The antenna 60 has a ground plane and choke rings which provide a 35 to 60 dB sector null below the ground plane, while producing a desirable antenna gain in the upper hemisphere. The CRPA antenna has up to seven antenna patches 61-1 through 61-7 which provide the capability of steering up to six 25 to 35 dB nulls toward jammers. These antenna patches are spaced at approximately a half wavelength apart.

Figure 3A:
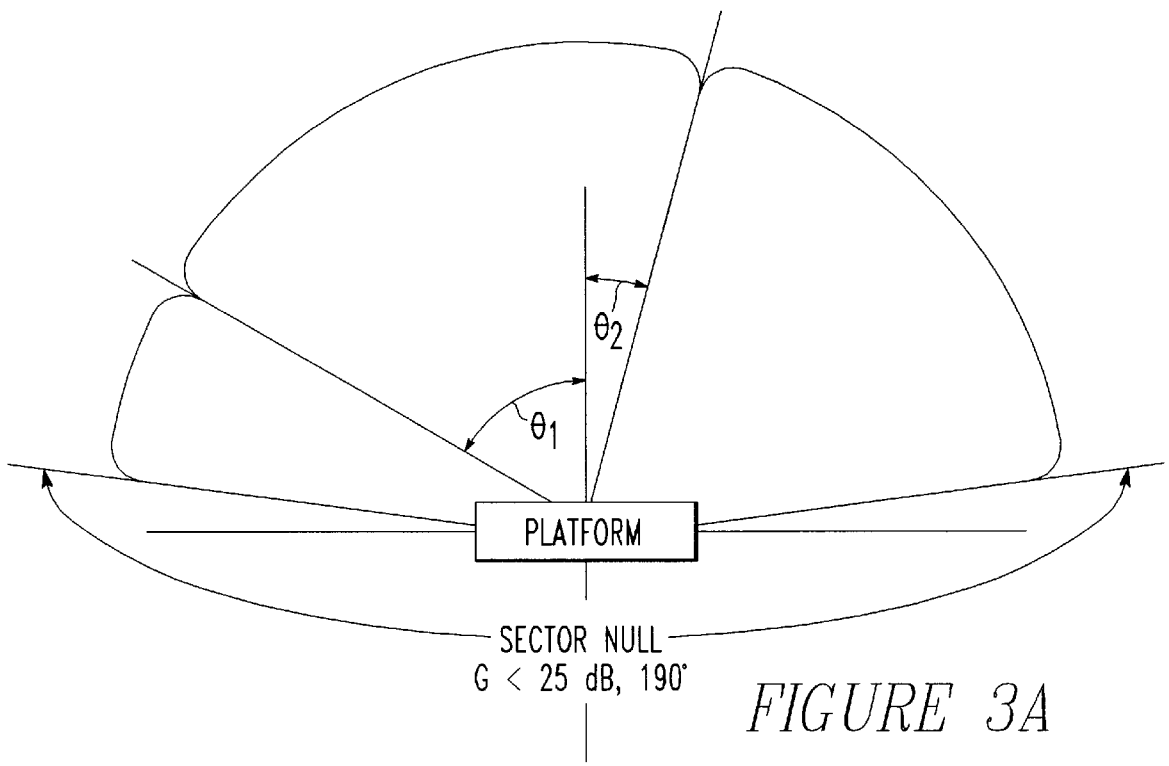
FIG. 3A is a diagram which illustrates the manner in which an anti-jam antenna module of the invention operates, when employed, with a sector null and preferably up to two aerial nulls to suppress ground-based jammers and airborne jammers of greatest magnitude.

However, as shown in FIG. 3A, the antenna 60 preferably uses two 25 dB steerable nulls which combine to form one 50 dB null. A digital configuration manager processor 62 employs feedback to provide null steering and minimize the amount of jammer energy present in a signal sent from the antenna 60 to the digital receiver 58. The configuration manager 62 also operates to identify and correctly process blinking jammers which might otherwise tax the capability of the CRPA antenna from performing its mission.

The typical adaptive array antenna 60 employs a manifold for the signals from up to seven patch antennas rather than carrying the signals in up to seven analog channels. This arrangement significantly simplifies the analog part of the system. The illustrated seven element adaptive array antenna with its 7:1 manifold requires a single 14 bit A/D converter 90 to steer the nulls as efficiently as 2-bit A/D converters used with each antenna element in the equivalent digital CRPA.

In the preferred invention embodiment, as few as three antenna patches are used. The two-null analog CRPA antenna of the invention is approximately 25% smaller in diameter (50% smaller in area) and has only three patch antennas. The 3:1 manifold requires a 6-bit A/D converter to steer the nulls as efficiently as a 2-bit A/D converter for each antenna element in the equivalent two-null digital CRPA. The reduction from seven elements to three elements, and the associated reduction in the A/D converter requirements for the preferred embodiment, leads to a simpler, less costly digital receiver 58.

Figure 3B:
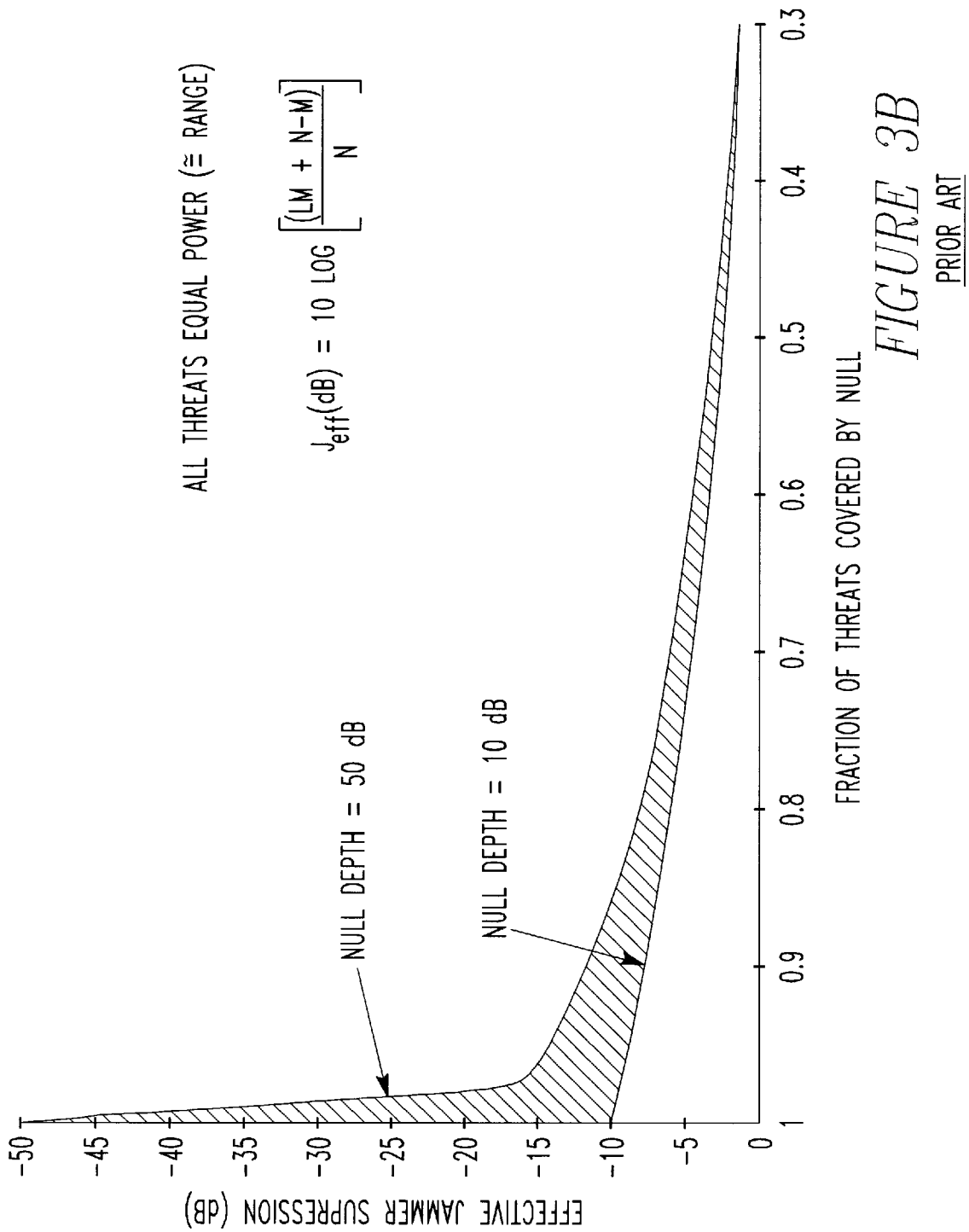
FIG. 3B graphically illustrates anti-jam limitations of deep-null, multiple antennas typically employed in prior art GPS receivers.
Figure 3C:
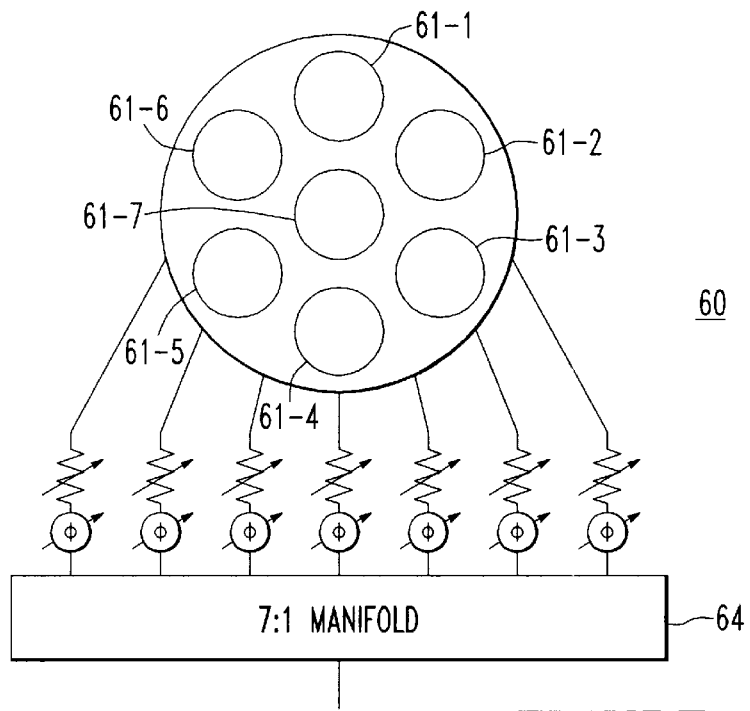
FIG. 3C is a schematic diagram of an adaptive array antenna preferably modularly employed in the GPS receiver of FIG. 2B.

FIG. 3B is based on an existing CRPA quoted as having 50 dB deep steerable nulls and graphically illustrates why multiple, deep-null GPS receivers of the prior art have a poor return on investment. Basically, such receivers are expensive yet relatively easily defeated. In FIG. 3B, the CRPA has five 50 dB deep nulls. If five jammer threats exist, the total J/S is reduced by 50 dB. However, if six threats exist, only 83% of the threats are attacked by the CRPA, and the overall effective suppression is 9 dB which is only 2 dB better than the performance achievable with a CRPA having five 10 dB deep nulls. Normally, a null requires about 10 microseconds of computer processing to be created, and during this processing time the receiver is vulnerable to various jamming threats. It is thus at least questionable whether the considerable cost and computational time for creating the 50 dB nulls is justifiable.

CRPAs which use a random search for null location placement are highly vulnerable to multiple jammer threats, and further are even vulnerable to only two jammers if they are separated by more than one null-width, and are repeatedly toggled on-off. Dependent on the repetition rate, the null processor may never catch up with the toggled jammers and properly place the nulls on the jammers.

Generally, the AJ RF module 54 receives a signal from the antenna module 52 to generate a filtered output for down-converting. A conventional RF preamplifier 57 amplifies the signal to a level set by the configuration manager 62. By setting the signal level high, the configuration manager 62 forces RF filtering to operate in a linear region, thereby passing the input signal through the RF module 54 virtually (ignoring insertion losses) unaltered. By setting the level low, the configuration manager 62 forces the RF filtering to operate over both linear and saturated regions, causing the input signal to be significantly attenuated for signal levels above an intrinsic filtering threshold value.

In the AJ RF module 54 (FIG. 2B), a receiver protector 55 is included as a sub-module which provides protection against microwave transmissions intended to "burn-out" the GPS receiver 32. The receiver protector 55 is omitted if it is not needed in a particular product. The receiver protector 55 operates on the signal input from the antenna module 52 in providing this additional AJ feature of the invention. The receiver protector 55 is a limiter device which either reflects or absorbs essentially all incident RF power above a certain level.

Preferably, a PIN diode limiter is employed as the receiver protector 55 because its insertion loss can be as small as a few tenths of a dB. The PIN diode works as a receiver protector by having its bias level, and hence its shunt impedance, a function of incident RF power.

Figure 4:
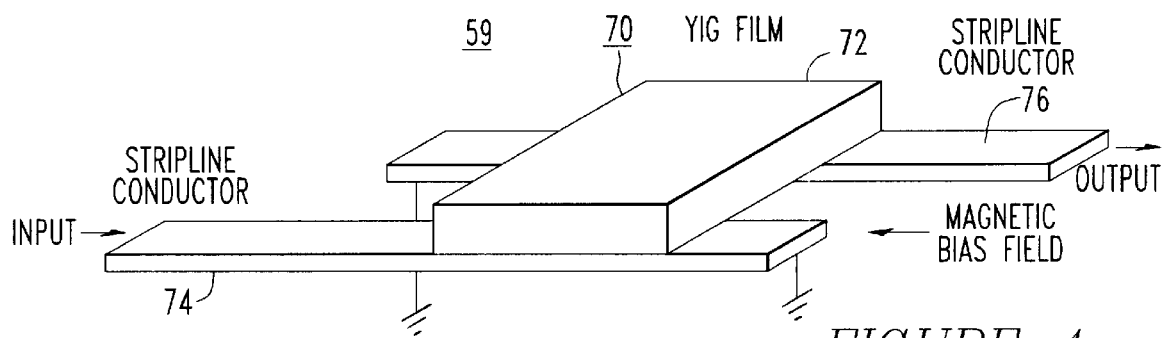
FIG. 4 is a schematic diagram of an adaptive RF filter which operates in an RF module in the GPS receiver of FIG. 2B on the basis of magnetostatic wave delay lines.

In the AJ RF module 54, an adaptive RF filter 59 (FIG. 4) provides an additional AJ feature of the invention. As previously indicated, the AJ RF module 54 is preferably included as a core jammer suppression module in RF receiver products of the invention. However, the AJ RF module 54 can be omitted and replaced by a conventional RF module (not shown) containing only a preamplifier and, if desired, a band pass filter in products having no need for the AJ capability of the AJ RF module 54.

Unlike conventional GPS notch filters which use tunable lumped element circuits requiring processing time, the adaptive RF filter 59 is embodied as a magneto-static surface wave structure 70 which operates at the molecular level. A magnetic material 72, preferably yttrium, iron, and garnet (YIG), is mounted on stripline conductors 74, 76. When appropriately biased by an external magnetic field, this configuration functions as a variable impedance transmission line which uses a spin wave to absorb excess energy above a threshold value from incoming signals. The threshold for this effect is tunable through film thickness. This AJ suppression technique is excellent for mitigating single and multiple high power CW threats.

The molecular level adaptive RF filter 70 operates as a frequency or, more precisely, a power selective limiter which suppresses high power jamming signals above a threshold level by absorbing excess energy within a spin wave. The preferred YIG filter is made adaptive through a signal feed back from the configuration manager 62 which controls the gain of amplifier 57 and hence the signal level injected into the YIG filter.

The YIG filter 70 preferably provides 20 dB of jammer suppression, and is cascadable allowing higher levels of jammer suppression (at a cost of greater insertion loss) if required. The primary targets for the adaptive RF filter 59 are CW jammers that try to eliminate Y-code operation in military receivers by precise placement of a jamming signal on either or both sides of the C/A-code.

In the prior art, various filters have been used for RF AJ filtering. For example, notch filters have been employed, but such filters tend to be bulky and are not susceptible to miniaturization. Further, adaptive notch filters have typically been easily defeated by agile jammers, because they do not operate at the molecular level.

In contrast, the adaptive RF filter of the invention is based on molecular level filtering to lend itself to miniaturization, operates to handle multiple jammers, and operates with agility to follow agile jammers. Although the adaptive RF filter of the invention will not handle noise jamming, it is powerfully effective against CW, swept CW, and pulse CW jammers. Moreover, this RF filter is relatively low cost and can be cascaded for multiplied suppression of jamming signals.

The following publication provides further information on YIG filters and is hereby incorporated by reference:

Frequency Selective Limiters for High Dynamic Range Microwave Receivers published in IEEE Transactions on Microwave Theory and Techniques, Vol. 41, No. 12, December 1993, pps. 2227–2231, by J. Douglas Adam and Steven N. Stitzer.

The following United States patents provide additional information regarding YIG filters are hereby incorporated by reference:

U.S. Pat. No. 4,595,889 entitled FREQUENCY SELECTIVE SIGNAL-TO-NOISE ENHANCER/LIMITER APPARATUS, issued to S. N. Stitzer et al. on Jun. 17, 1986, and assigned to The United States of America as represented by the Secretary of the Air Force;

U.S. Pat. No. 4,845,439 entitled FREQUENCY SELECTIVE LIMITING DEVICE, issued to S. N. Stitzer et al. on Jul. 4, 1989, and assigned to the present assignee; and U.S. Pat. No. 4,980,657 entitled COPLANAR WAVEGUIDE FREQUENCY SELECTIVE LIMITER, issued to S. N. Stitzer et al. on Dec. 25, 1990, and assigned to the present assignee.

The AJ analog receiver module 56 (FIG. 2B) is structured principally with analog circuitry, and is thus included, at the system level, in the analog portion of the analog/digital hybrid GPS receiver 50. The analog receiver module 56 is configured with amplifiers, filters, and mixers to function as a superheterodyne receiver with two or more stages of downconversion. A first frequency mixer 82 downconverts a signal from the RF module to a first intermediate frequency (IF) level, and a second frequency mixer 84 provides further downconverting of the signal to a second IF level. Amplifiers are connected as shown in the embodiment of FIG. 2B with automatic gain control.

A multi-stage IF filter arrangement operates by adaptive cancellation in the first and second IF levels to provide additional jammer suppression in the GPS receiver 50. This filter arrangement can be variably arranged adaptively identifies and eliminates narrow-band CW jammer signals and wide-band spread spectrum signals from the signals passed through them. In the modularity aspect of the invention, the AJ analog receiver module 56 can be a core AJ module in embodying the invention in various products as previously described. If the RF module 54 is the core module of a group of receiver products, the analog receiver module 56 is included in its jammer suppression capability as needed by the user. Otherwise, the module 56 can be used without its AJ filters. Various configurations of the analog receiver module may differ in the number and placement of IF AJ filters.

A narrow band IF filter 86 preferably handles only one notch at a time and extends the capability of the adaptive RF filter 59, if the latter is modularly included in applying the invention, as in the case of the GPS receiver 50. The narrow-band IF filter 86 is structured to provide at least 45 dB rejection of narrow-band jammer signals. A broadband IF filter 88 is structured to suppress broadband jammer signals with a rejection of at least 30 dB.

The narrow band IF filter 86 is preferably embodied as a filter configuration known commercially as a COLT C filter. The broad band IF filter 88 is preferably embodied as a filter configuration known commercially as a Colt SS filter. These IF filters can be structured as disclosed in the following patents assigned to the present assignee and incorporated herein by reference:

U.S. Pat. No. 5,263,191 entitled METHOD AND CIRCUIT FOR PROCESSING AND FILTERING SIGNALS and issued to R. W. Dickerson on Nov. 16, 1993;

U.S. Pat. No. 5,339,456 entitled METHOD AND CIRCUIT FOR NON-COOPERATIVE INTERFERENCE SUPPRESSION OF RADIO FREQUENCY SIGNALS and issued to R. W. Dickerson on Aug. 16, 1994;

U.S. Pat. No. 5,355,533 entitled METHOD AND CIRCUIT FOR RADIO FREQUENCY SIGNAL DETECTION AND INTERFERENCE SUPPRESSION and issued to R. W. Dickerson on Oct. 11, 1994, and U.S. Pat. No. 5,428,834 entitled METHOD AND CIRCUIT FOR PROCESSING AND FILTERING SIGNALS and issued to R. W. Dickerson on Jun. 27, 1995.

Figure 5A:
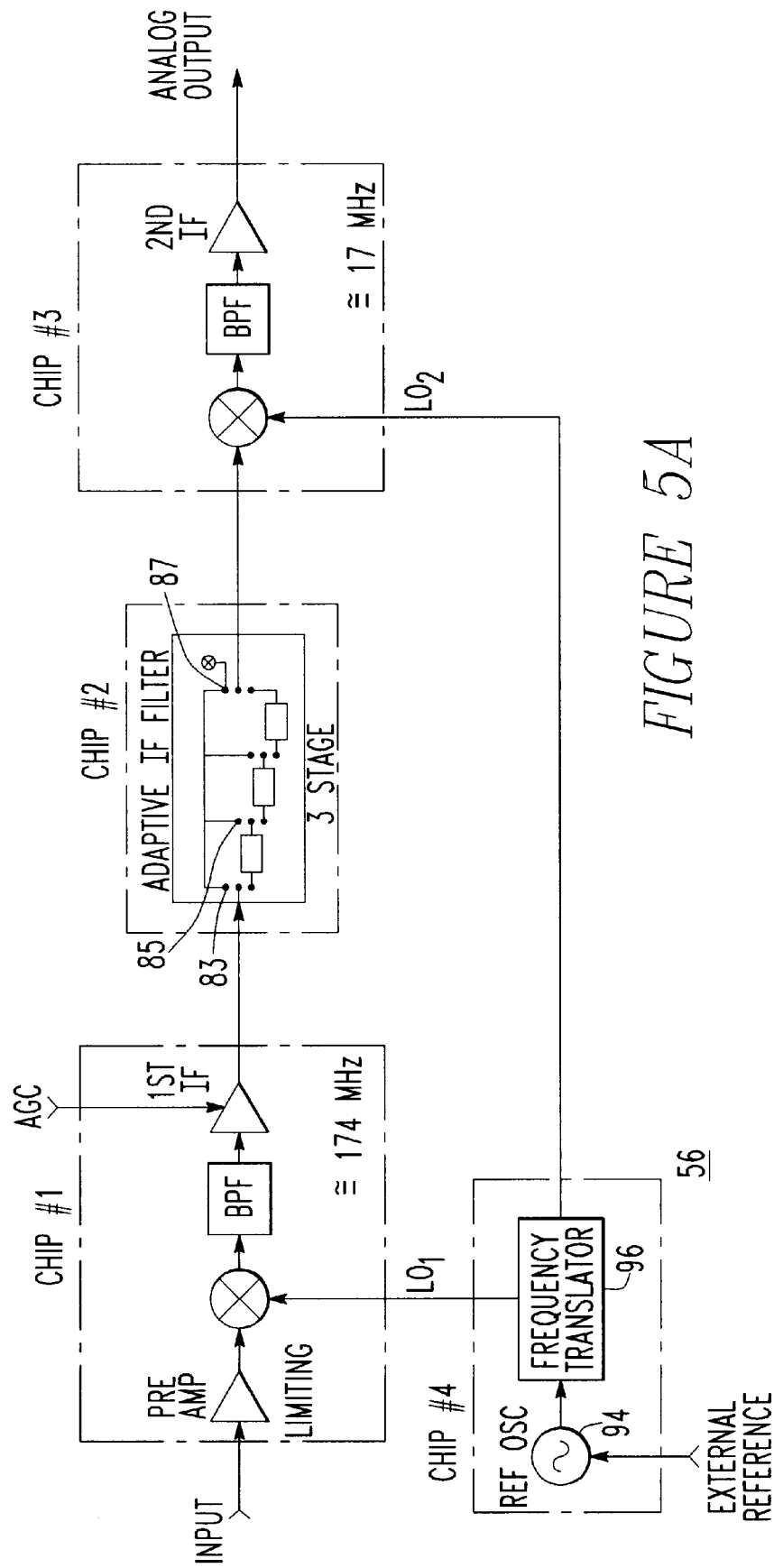
FIG. 5A is a circuit block diagram representing an analog receiver module employed in the GPS receiver of FIG. 2B.
Figure 5B:
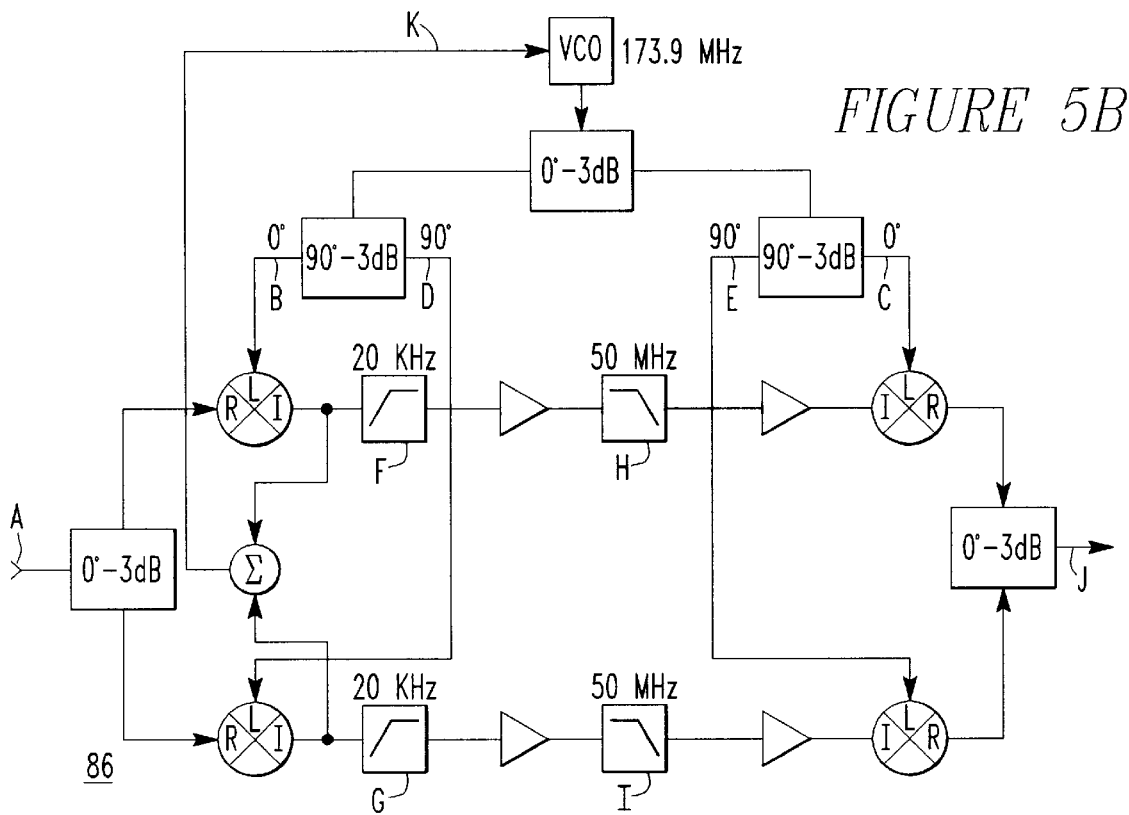
FIGS. 5B and 5C schematically illustrate narrow-band and wide-band IF filters respectively employed in first and second downconverting stages of the analog receiver module of FIG. 5A.
Figure 5C:
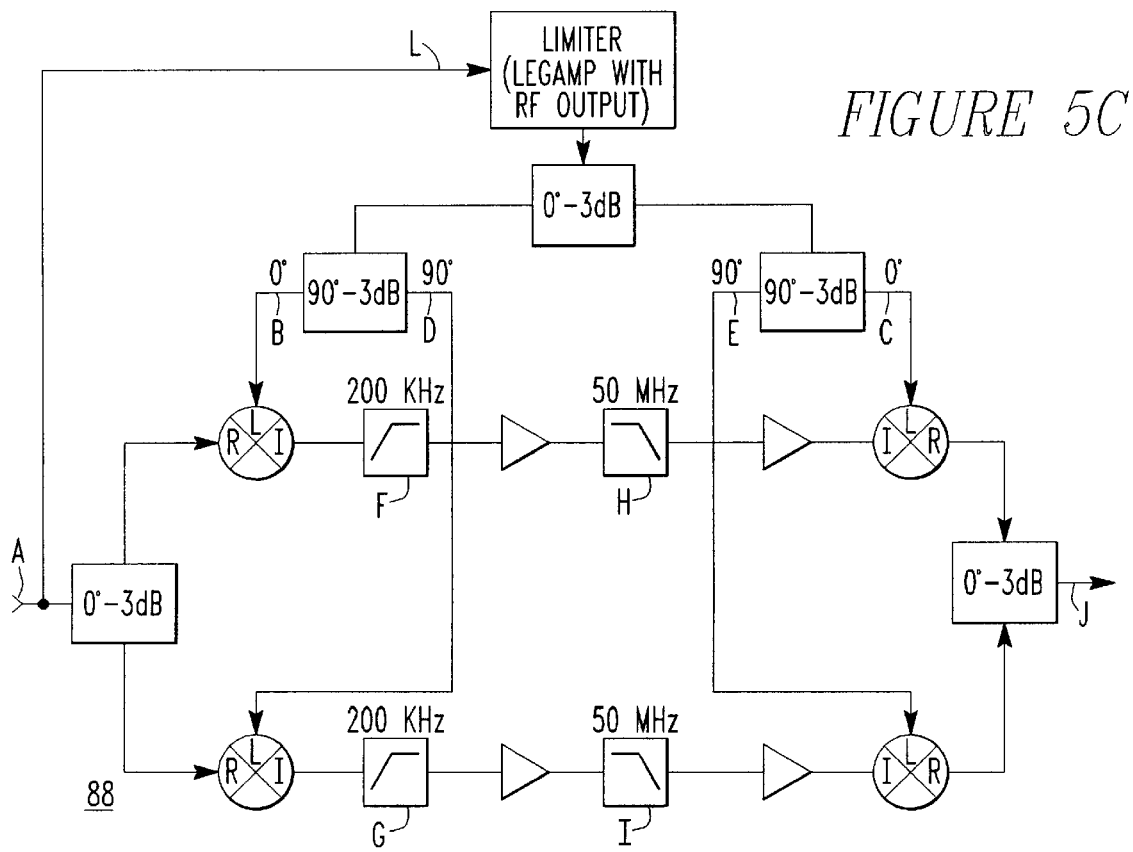

Generally, as shown in FIGS. 5B and 5C, the COLT filters are adaptive signal cancellers which identify and remove any high power jammer signal from the circuitry. The COLT C filter has been tested to establish that the COLT C provides 40 to 45 dB jammer suppression against CW jamming, 12 to 17 dB jammer suppression against BPSK jamming, and 15 to 20 dB of jammer suppression against QPSK jamming. For comparison, the prior art Amplitude Domain Processing (ADP) technique only provides 30 dB jammer suppression against CW jamming and 20 dB against PSK jamming. The COLT filter technology has the further comparative advantage of being suitable for miniaturization.

The narrow band signal canceller 86 illustrated in FIG. 5B breaks up an incoming composite signal at A into two parts. It drives a voltage controlled oscillator (VCO) with an error signal K and forms direct B and quadrature D signals proportional to the largest incoming signal (the jammer or interference signal). Through the use of appropriate high pass filters F and G and low pass filters H and I, all product signals are eliminated except the product of the interference signal and the signal of interest from the two signal paths. Finally, the resultant signal is recombined with direct C and quadrature E copies of the interference signal to form remaining (smaller) direct and quadrature signals of interest which are recombined into a single signal at an output J.

The wide band signal canceller illustrated in FIG. 5D breaks up an incoming composite signal at A into two parts. It drives a log limiting amplifier which compresses the incoming signal L and forms direct B and quadrature D signals proportional to the largest incoming signal (the jammer or interference signal). Through the use of appropriate high pass filters F and G and low pass filters H and I, all product signals are eliminated except the product of the interference signal and the signal of interest from the two signal paths. Finally, the resultant signal is recombined with direct C and quadrature E copies of the interference signal to form remaining (smaller) direct and quadrature signals of interest which are recombined into a single signal at an output J.

FIG. 5A illustrates an AJ analog receiver module 56 embodied in miniaturized form, i.e., with semiconductor chips #1, #2, #3, and #4. The #1 chip embodies the first IF downconversion stage with a bandpass filter 90. The #3 chip similarly embodies the second IF downconversion stage with a bandpass filter 92.

The #4 chip provides a reference oscillator 94 and a frequency translator 96 which generates mixer frequencies LO1 and LO2. The #2 chip can embody, for example, a one, two or three (shown) stage Colt filter connected between the first and second IF stages. Other variants of this miniature analog receiver module can be realized from the combination of chips. Respective bypass switches 83, 85, and 87 are controlled by the configuration manager 62 to bypass any combination of COLT filtering stages, such as the third stage, or the second and third stages, or all three stages.

Figure 6A:
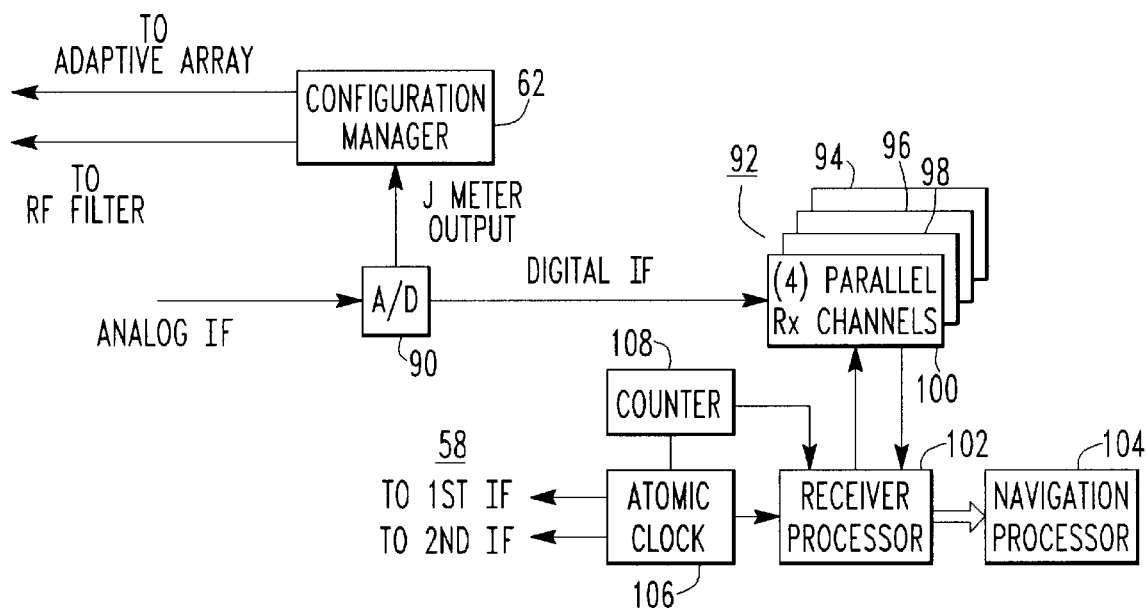
FIG. 6A shows a block diagram of a digital receiver module which is connected to the output of the analog receiver module in the GPS receiver of FIG. 2B and operates to enhance navigation signals while providing improved suppression of jammers.

The AJ analog receiver module 56 applies an analog IF output signal to an analog/digital (A/D) converter 90 at the input of the AJ digital receiver module 58 (FIGS. 2B and 6A). In the module 58, the configuration manager processor 62 preferably is a microcontroller programmed to respond to an output signal from the A/D converter 90 and apply feedback control to the adaptive antenna array 60 and the adaptive RF filter 59 as shown in FIG. 2B. The digital receiver module has AJ capabilities which also may be separately or collectively deselected in an RF receiver product if a user has no need for them.

As previously indicated, the configuration manager 62 is structured to steer antenna nulls for minimized jammer signal content in the digital signal output from the A/D converter 90 and to control the threshold level of the RF filter, i.e., to control the threshold level of the preferred YIG filter by varying its input signal level.

The A/D converter 90 (FIGS. 2B, 6E) is preferably structured with a wide range to provide greater dynamic range in searching for a satellite navigation signal relative to a jammer signal(s). FIG. 6E shows a typical 2-bit A/D converter with a J/N meter used in some state-of-the-art GPS receivers. Since each bit added to the A/D converter 90 widens the dynamic range by approximately 6 dB, a GPS receiver with an 8 bit A/D converter has a processing gain improved by at least 36 dB over the typical GPS receiver. In AJ GPS receivers provided with adaptive array antennas in accordance with the invention, the A/D converter 90 is at least an n×2 bit converter where n is the number of patch antennas used to get the minimum dynamic range. For the three element CRPA chosen for the preferred embodiment, the minimum bit width of the A/D converter 90 is at least 6 bits for full effectiveness.

Hardware is preferably used in the A/D converter 90 for detection of noise, CW and PSK jamming. The presence or absence of a jammer is determined by a J meter also referred to as a J/N meter as illustrated in FIG. 6E. Once a jammer has been detected, the signal is sent to a device 91 such as a Fast Fourier Transform (FFT) to determine whether this jammer signal is characterized by a single frequency (CW), multiple frequencies (PSK), or otherwise (Noise). This is a coarse hardware method for implementing signal support for the configuration manager 62. Other more sophisticated techniques can be used for more sophisticated receiver designs. In other applications of the invention, jammer signal detection can be embodied by software, such as in the configuration manager processor 62.

A plurality of signal channels 92 are provided in the AJ digital receiver module 58 for separate processing of the multiple satellite navigation signals contained in the output from the A/D converter 90. The total number of GPS satellite signals can vary based on the number of carriers broadcast by the GPS satellites and the number of variant satellite systems in orbit. In the case where a total of sixteen GPS satellite signals are to be processed, a total of 16 channels for processing of satellite signals can be provided, i.e., four channels on each of four channel boards 94, 96, 98, and 100.

The number of channel boards provided in any particular GPS receiver configuration depends on the desired navigation accuracy. For example, a single channel board provides the least accuracy, whereas all four channel boards can provide the highest accuracy.

Each navigation signal carries a satellite signature, i.e., orbit parameters, the time at which the signal was sent and other information useful to accurate location and time determination. The signals are applied from the channels 92 to a receiver processor 102 which is conventionally programmed to respond to signal data for at least four satellites and compute the location of the platform carrying the GPS receiver 50. The receiver processor applies an output to a navigation processor 104 to compute navigation parameters for motion control of the GPS receiver platform.

An on-board clock 106 corresponds to a sub-module within the AJ digital receiver module and generates a timing signal which enables calculation of the time of arrival of each satellite signal at the GPS receiver 50. The signal arrival times are used in the platform position computation described above. A counter 108 is driven by the clock 106 to generate a timer signal which provides greater RF navigation system availability since there is no need to compute time from the satellite signals. The clock 106 operates as a common frequency source for the analog receiver module and the digital receiver module to avoid errors which are otherwise possible.

To obtain additional AJ suppression and enhanced navigation signal reception, the clock 106 is preferably a phase stable oscillator which generates an output with precise timing, i.e., an atomic clock with $1 \times 10^{-11}$ or better stability and with low prime power input (preferably about ½ watt or less). More particularly, the atomic clock is preferably a cesium cell clock which is relatively low in cost, small in size (25 cubic centimeters), and low in power requirements (about 0.3 watts).

The cesium cell clock 106 can be embodied in accordance with the following United States patents which are assigned to the present assignee, which discloses more detailed information on a miniaturized atomic frequency standard, and which are hereby incorporated by reference:

U.S. Pat. No. 5,192,921 entitled MINIATURE ATOMIC FREQUENCY STANDARD and issued to P. J. Chantry et al. on Mar. 9, 1993.

U.S. Pat. No. 5,327,105 entitled GAS CELL FOR A MINIATURIZED ATOMIC FREQUENCY STANDARD and issued to I. Liberman et al. on Jul. 5, 1994.

U.S. Pat. No. 5,442,326 entitled ATOMIC TIME STANDARD WITH PIEZOELECTRIC STABILIZATION OF DIODE LASER LIGHT SOURCE and issued to I. Liberman on Aug. 15, 1995.

The following publications provide further information on cesium clocks and are hereby incorporated by reference:

A Low-Cost Atomic Clock: Impact on the National Airspace and GNSS Availability published in Proceedings of ION GPS-94, pps. 1329–1336, in Sep. 20–23, 1994, by John Murphy and Dr. Trent Skidmore; and Laser Pumped Cesium Cell Miniature Oscillator published in Proceedings of the 52nd Annual Meeting Navigation Technology for the Third Millenium, pps. 731–739, in Jun. 19–21, 1996, by Peter J. Chantry, Irving Liberman, William R. Verbanets, Carlo F. Petronio, Robert L. Cather, and William D. Partlow.

When the atomic clock 106 is modularly included in the GPS receiver 50, it provides significant additional AJ suppression and improved position accuracy based on better time accuracy. The atomic clock 106 also provides direct Y-code acquisition with as few as 64 correlators in less than one second, and further, for signal acquisition times of 100 seconds can improve processing gain by as much as 20 dB through reduced time uncertainty (as illustrated in FIG. 6C). As compared to conventional receivers in which crystal oscillators are employed, the GPS receiver 50, tightly coupled with the atomic clock 106, on average improves the intrinsic vertical accuracy by a factor of three and horizontal accuracy by 10%.

Figure 6B:
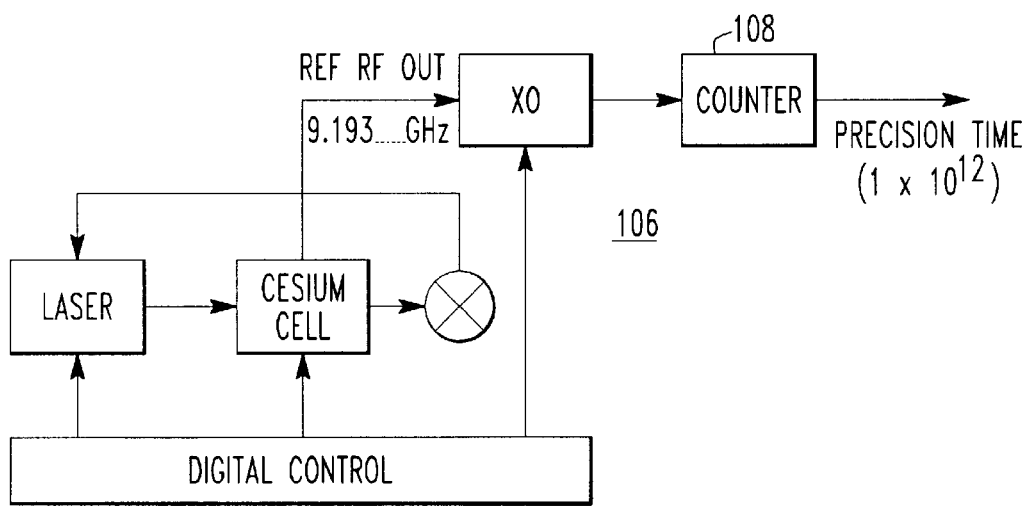
FIG. 6B illustrates an atomic clock employed in the digital receiver module of FIG. 6A.
Figure 6C:
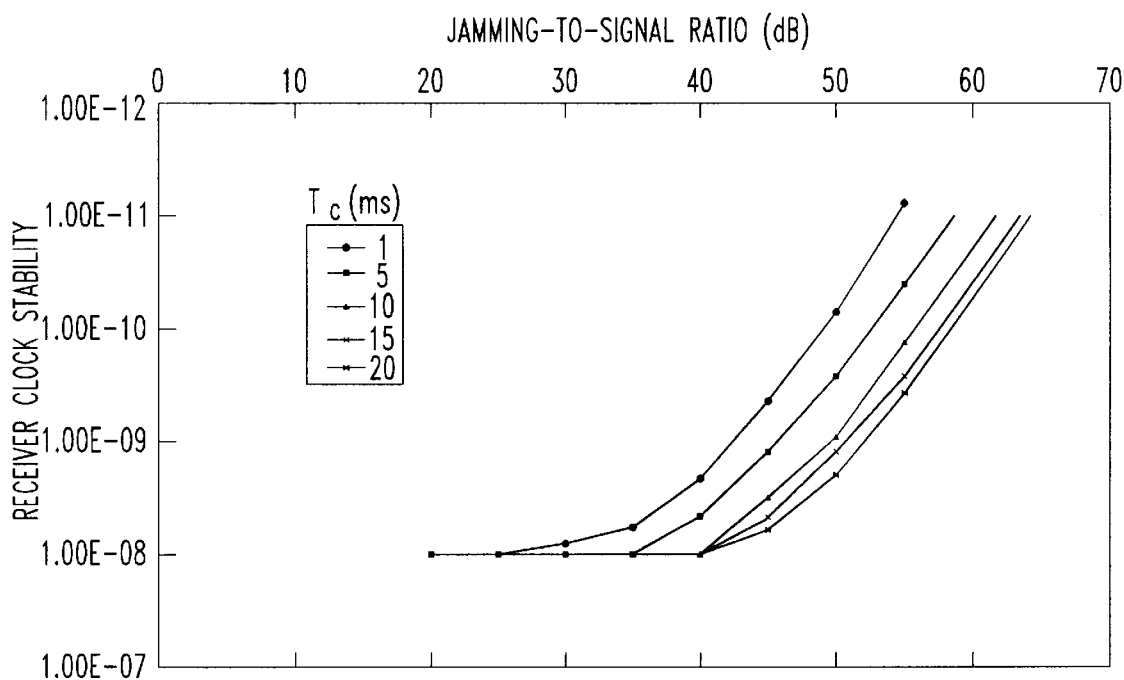
FIG. 6C graphically illustrates the influence of receiver clock stability on jammer suppression performance.

FIG. 6B shows a top level diagram of a miniature Cesium cell-based embodiment of the atomic clock 106. Fundamentally, this atomic clock is a highly stable frequency source which is achieved by an 852 nm laser 101 pumping the cesium atoms in a cesium cell 103 to an elevated state which can be probed with a 9,192,631,770 Hz microwave as it undergoes a hyperfine transition back to the ground state.

To establish the microwave frequency, light from the laser 101 is sent through the cesium cell 103 to an optical detector 105. By measuring the optical transmission through the cell 103 while it is being probed by the microwave frequency, digital control electronic circuitry accurately determine when the hyperline transition occurs, thereby accurately defining the microwave frequency to be 9,192,631,770 Hz.

The highly stable microwave frequency source operates in a phased locked loop to drive the output of a crystal oscillator (XO) at 10 MHz (or any other frequency of choice) with the same level of stability (on the order of 1 part in $10^{11}$). The output of the crystal oscillator (XO) is sent to the counter 108 to count the number of cycles from some initial point in time and maintain a time reference.

In the digital receiver 58 (FIG. 2A), conventional correlation techniques are employed to identify the satellite signals for processing through the channels 92 for navigation purposes. The configuration manager processor 62 responds to signals from the A/D converter 90 to configure the available AJ resources of the GPS receiver 50 for suppression of detected jammer threats.

In the preferred embodiment, the correlation process is the similar for C/A code and P code/Y code receivers. Such receivers employ different code generators (with decryption included for the Y code correlation). Conventional hardware 85 (FIG. 2B) is used in the digital receiver 58 to perform the correlation process. If desired, software can be used to perform the correlation process.

The digital signal provided to the correlator 85 is divided into in-phase (I) and quadrature (Q) components by multi-bit multiplication with the sine and cosine functions, respectively. The correlator 85 receives a copy of the appropriate code (C/A code or P code/Y code) from a code generator circuit. The correlator 85 searches this code space for a match with the incoming signal. When a match occurs, the correlator 85 is locked to the signal. The following description applies to a typical correlation process used in a GPS receiver.

Through the use of a shift register, the correlator 85 generates early, prompt and late copies of the appropriate single bit code. The correlator spacing between the early/prompt/late codes is set within the correlator 85 to be some fraction of a chip (the fraction may be as low as 0.1 during signal acquisition or as high as 0.5 during parallel code or carrier tracking) dependent upon the state (signal acquisition, parallel code or carrier tracking) of the correlator. For C/A carrier code, the chipping rate is 1.023 MHz while the P carrier code/Y carrier code chipping rate is 10.23 MHz. In this example, the correlation process is a multi-bit exclusive or between the single bit carrier codes and the multi-bit I and Q samples.

The correlator 85 includes a delay lock loop discriminator process which allows the selection of "early and late", "early-minus-late", and "punctual" correlation. The "early and late" correlation process is used during signal acquisition. The "early-minus-late" correlation process is used during optimal parallel code tracking. The "punctual" correlation process is used during carrier tracking. A detailed description of these discriminator functions is provided in "Understanding GPS: Principles and Applications" edited by E. D. Kaplan.

The correlator 85 is coupled to accumulators (not shown) which accumulate (or time average) the correlated samples over some period of time. The accumulation process results in an output signal if full correlation is achieved, or it results in no output signal when the signal is uncorrelated (i.e., the signal components are still pseudorandom over the averaging time) with the internally generated carrier codes. Once the correlators are locked to the signal, the signal is channeled to the receiver processor 102 for extraction of the data message (50 Hz information modulated on top of the carrier signal) from the signal.

The configuration manager processor 62 employs hardware/software to control the use or non-use of the variety of AJ technologies built into the GPS receiver 50. The configuration manager processor 62 can be designed/preprogrammed with knowledge of the receiver configuration or it can dynamically determine the receiver configuration from signals provided to it. The configuration manager logic is modular corresponding to the modular construction of the GPS receiver 50. However, the configuration manager processor 62 can be configured utilizing a minimal set of logic only appropriate to the receiver hardware configuration for which it is designed or it can be made utilizing a maximal set of logic which is adaptable to any possible configuration that might be implemented. The following description is based on a non-adaptable configuration manager processor which manages a system containing all AJ resources described herein.

The configuration manager 62 employs external hardware in the A/D converter 90 to examine the signal levels present before the signals are sent to the digital receiver processor 102. The hardware compares these signal levels with the level of the noise floor to determine if there is any jamming needing to be removed by the anti-jam features of the GPS receiver. If a jamming threat exists, the hardware then does a frequency analysis such as a simple Fourier transformation of the signal to determine its frequency characteristics.

From these measurements the configuration manager 62 begins to assign anti-jam resources against the threats. The first anti-jam resource is the antenna module 52. The configuration manager 62 places one null on a target by searching in space for a single null antenna pattern which minimizes the impact of the jammer signal.

If the null brings the signal level down to the noise floor, only one noise threat needed to be removed and was removed. Otherwise, the configuration manager 62 places two nulls on the two largest targets by searching in space for the second null pattern which minimizes the impact on the jammer signal.

Next, the configuration manager 62 assesses the existence of a CW threat using frequency analysis. If a CW threat exists, the configuration manager 62 sets the injection level for the RF filter such that the RF filter attacks the CW threat. Otherwise, it sets the injection level for the RF filters to pass the signal through to the next stage in the receiver analog section.

The configuration manager 62 then reassesses the existence of a CW threat using frequency analysis. If a CW threat exists, the configuration manager 62 sets the analog receiver module to use the COLT-C IF filter to remove the remaining CW threat; otherwise, it bypasses the COLT-C IF filter. Next, the configuration manager 62 determines whether a broadband or PSK threat exists using the latest frequency analysis of the signal waveform going to the digital receiver 58.

If a PSK threat exists, the configuration manager 62 sets the analog receiver module to use the COLT-SS IF filter to remove the PSK threat; otherwise, it bypasses the COLT-SS filter.

Through the use of the configuration manager 62, an optimal signal level to jammer level can be presented to the digital receiver 58 for correlation processing. The configuration manager 62 operates with the ability to detect the presence or absence of a jamming signal. By detecting the absence of a jamming signal, the configuration manager 62 provides the digital receiver with the largest IF signal level which has not been processed by any of the analog front-end anti-jam features.

Figure 6D:
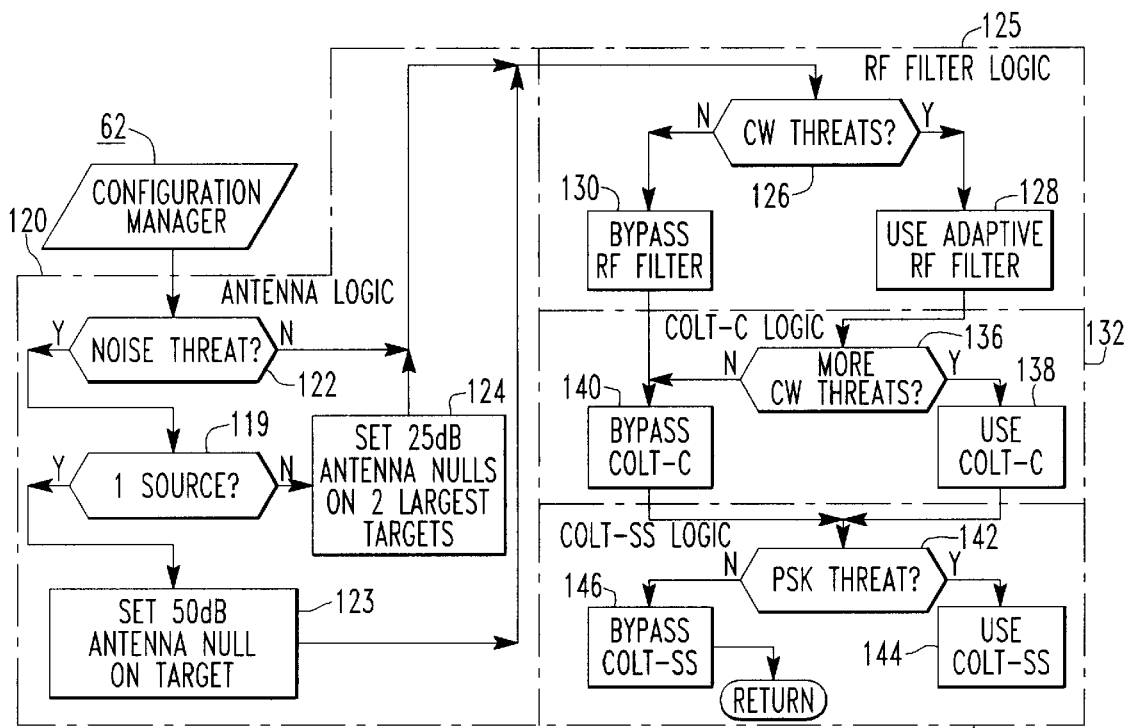
FIG. 6D is a logic diagram which illustrates the basic operation of a configuration manager processor employed in the digital module of FIG. 6A.
Figure 6E:
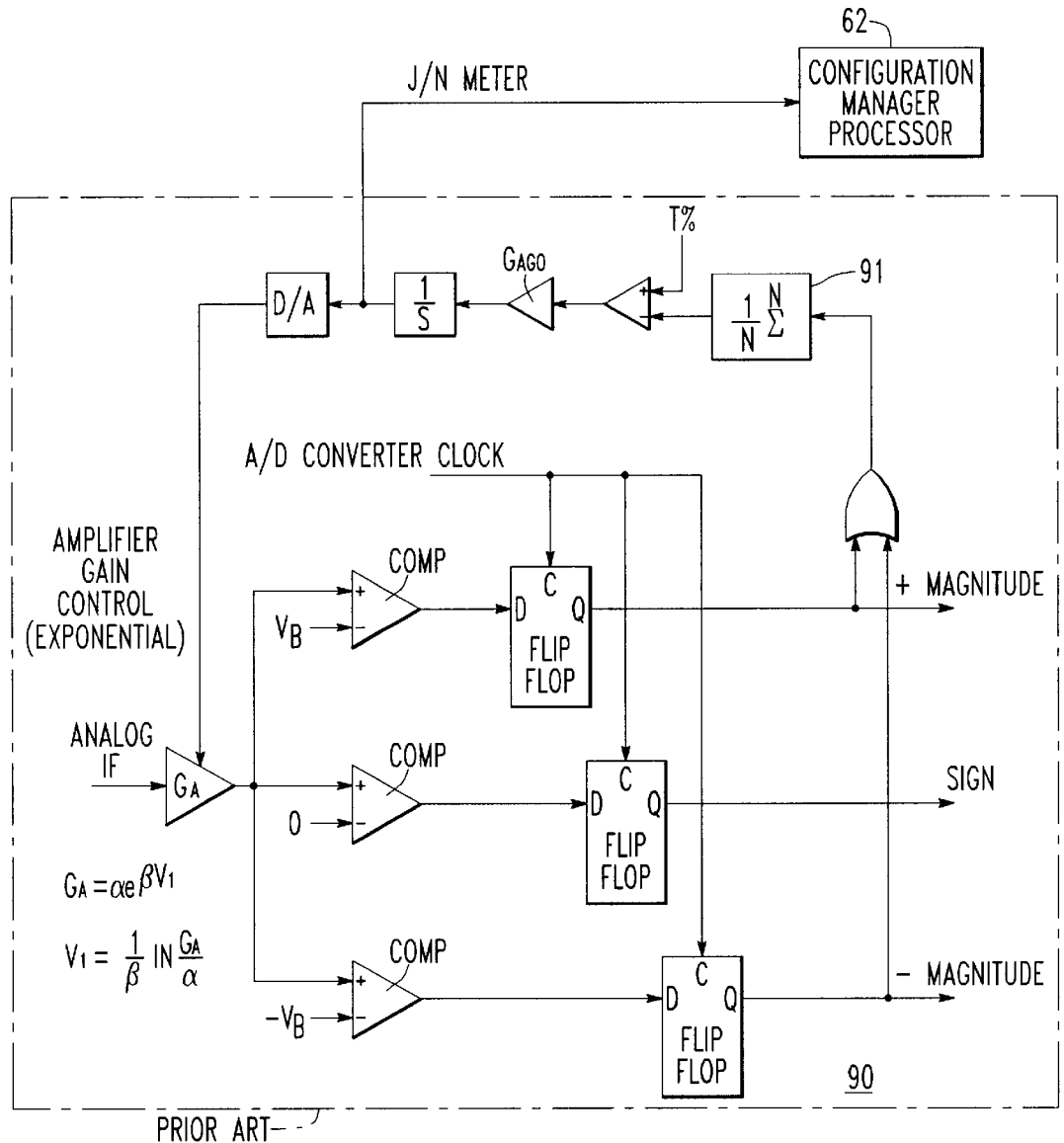
FIG. 6E is a block diagram illustrating a typical prior art J/N meter output for an adaptive analog/digital converter employed in the digital receiver of FIG. 6A.

The logic operation of the configuration manager processor 62, in performing AJ configuration management, is represented by the flow diagram shown in FIG. 6D. Antenna module logic is performed as illustrated in dotted box 120 if the AJ antenna module 60 is included in the GPS receiver 50, as it is here. If a noise threat is detected by block 122, a 50 dB antenna null is directed to the target if only one threat is present. If two or more threats are present, block 124 directs two 25 dB nulls against the two largest threats.

In RF filter logic indicated by dotted box 125, test block 126 next determines whether CW threats are present and, if so, the adaptive RF filter 59 is activated by block 128 (when, as here, the filter 59 is included in the GPS receiver). The RF filter 59 is bypassed by block 130 if no CW threats are present.

IF filter logic is next performed as indicated in dotted boxes 132 and 134. If test block 136 determines that more CW threats are present, the Colt-C filter 89 is activated as indicated by block 138 in the first IF stage. Otherwise, the Colt-C filter 59 is bypassed by block 140.

Test block 142 then determines whether a PSK threat is present. If so, the Colt-SS filter 88 is activated by block 144. Otherwise, block 146 directs the Colt-SS filter 88 to be bypassed and a return is made for the logic to be repeated in the next cycle of operation.

Figure 8:
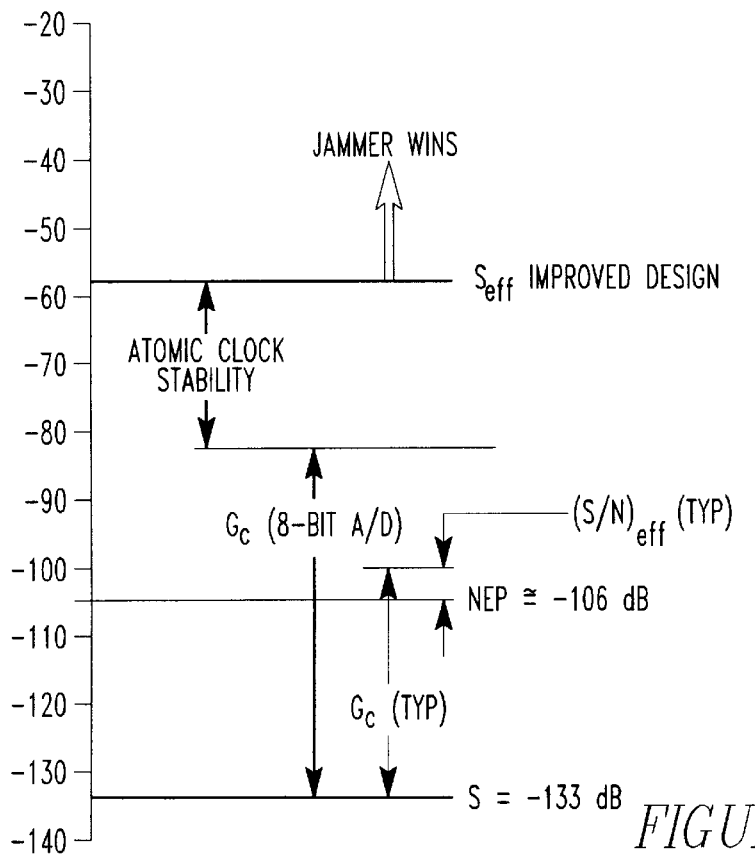
FIG. 8 graphically illustrates how the GPS receiver of the invention enhances a satellite navigation signal.

The digital receiver module 58 has the following advantages when it is structured in accordance with the invention:

A/D Increased Bit Improves Signal(s) Capture
   Results in Reduced J/S up to 36 dB
Flexibility-Minimum (4) Satellites for Low-Tech Platforms
   Maximum (16) Satellites for Prime Platforms
Configuration Manager Controls Threat Prioritization
Atomic Clock Allows Fewer Correlators~60
Receiver Processor with 50% Excess Capacity-Growth
Data Rate Adaptable to Platform Requirements FIG. 8 graphically illustrates the manner in which the invention provides enhanced reception of satellite signals, even in the absence of jammers.

Figure 9:
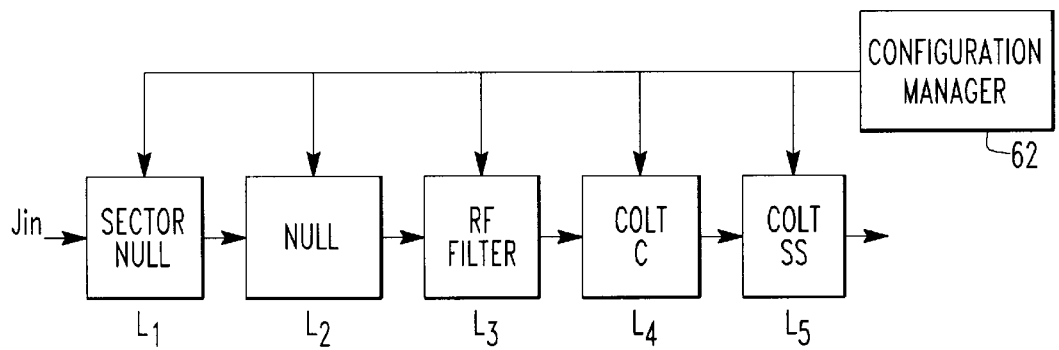
FIG. 9 graphically illustrates how the invention suppresses different jammer threats.

FIG. 9 shows how suppression is applied to jammer threats in accordance with the operation of the configuration manager 62.

The following apply to FIG. 9:

$$J_{1_{out}} = \prod_i L_i J_{1_{in}}$$

$$\vdots$$

$$J_{n_{out}} = \prod_i L_i J_{n_{in}}$$

$$J_{T_{out}} = \sum_n J_{n_{out}} = \sum_n \left( \prod_i L_i J_{1_m} \right); \text{ where } L = L \text{ (J type)}$$

Figure 10:
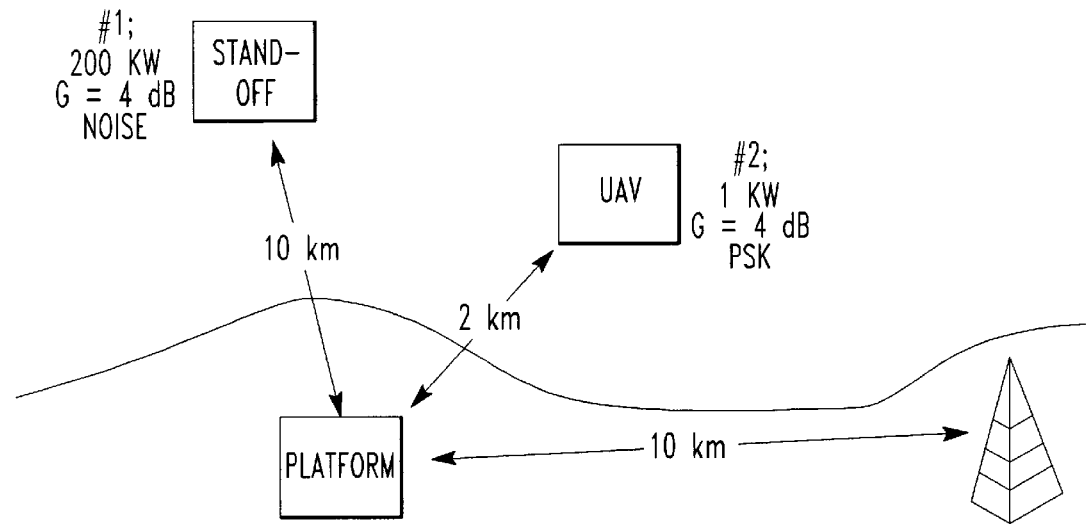
FIG. 10 is a schematic diagram illustrating a multiple threat scenario for a surface platform.
Figure 11:
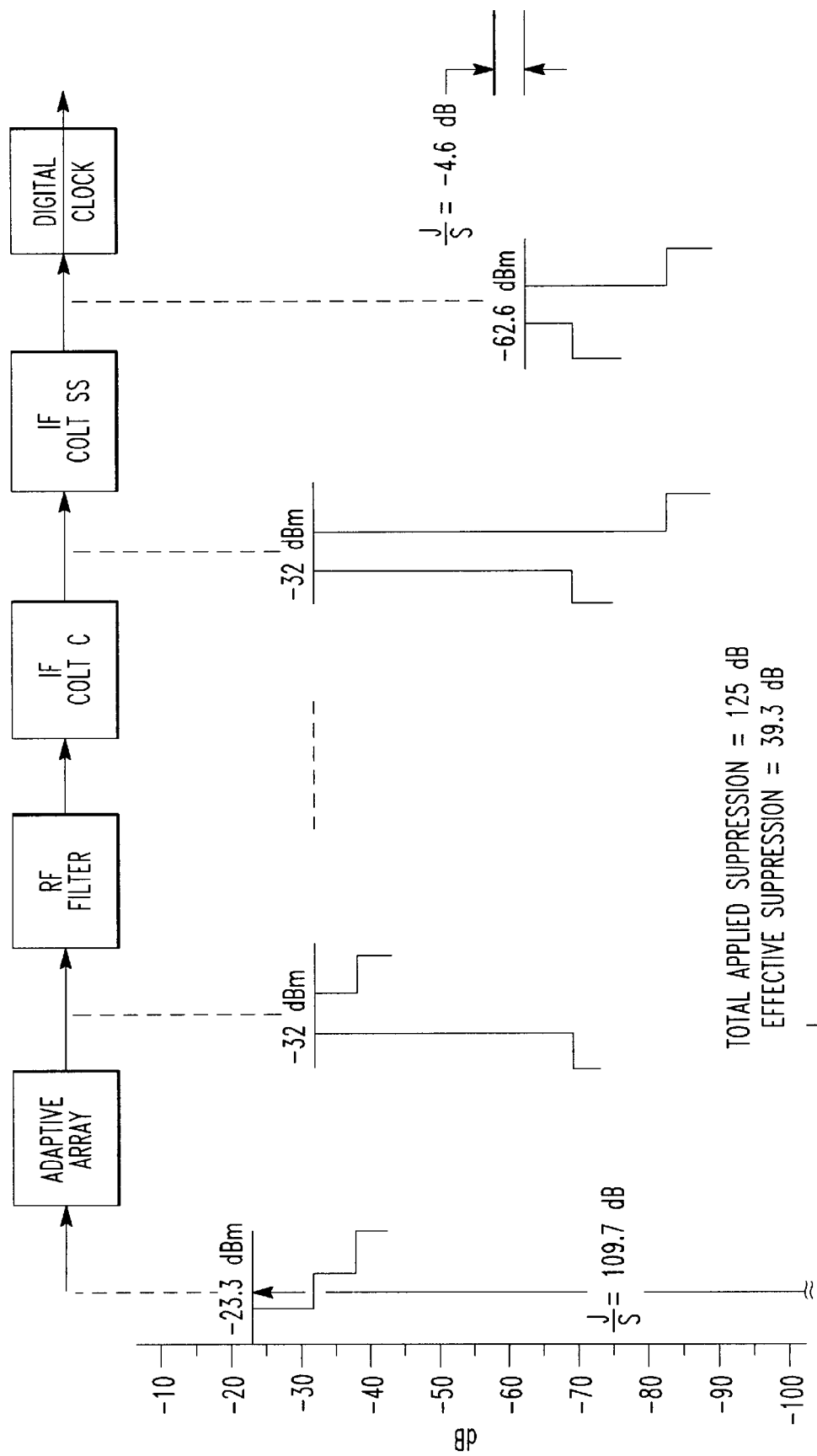
FIG. 11 graphically illustrates how the invention suppresses multiple jammer threats like those of FIG. 10.

In FIG. 10, an exemplary multiple jammer threat scenario is shown for a surface platform. FIG. 11 graphically illustrates how the GPS receiver 50 handles the multiple jammer threats for the surface platform.

Figure 12:
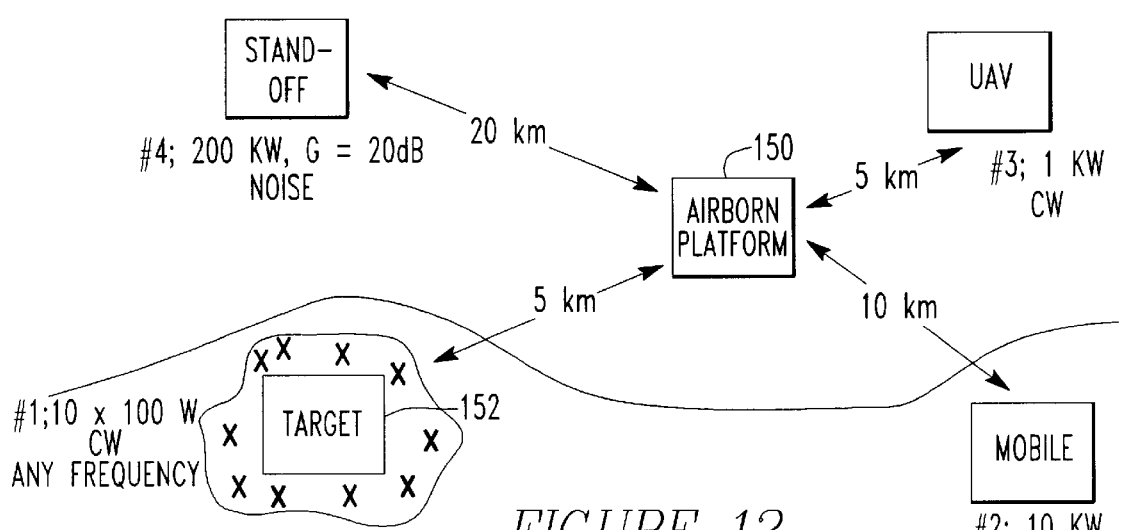
FIG. 12 is a schematic diagram illustrating a multiple threat scenario for an airborne platform.
Figure 13:
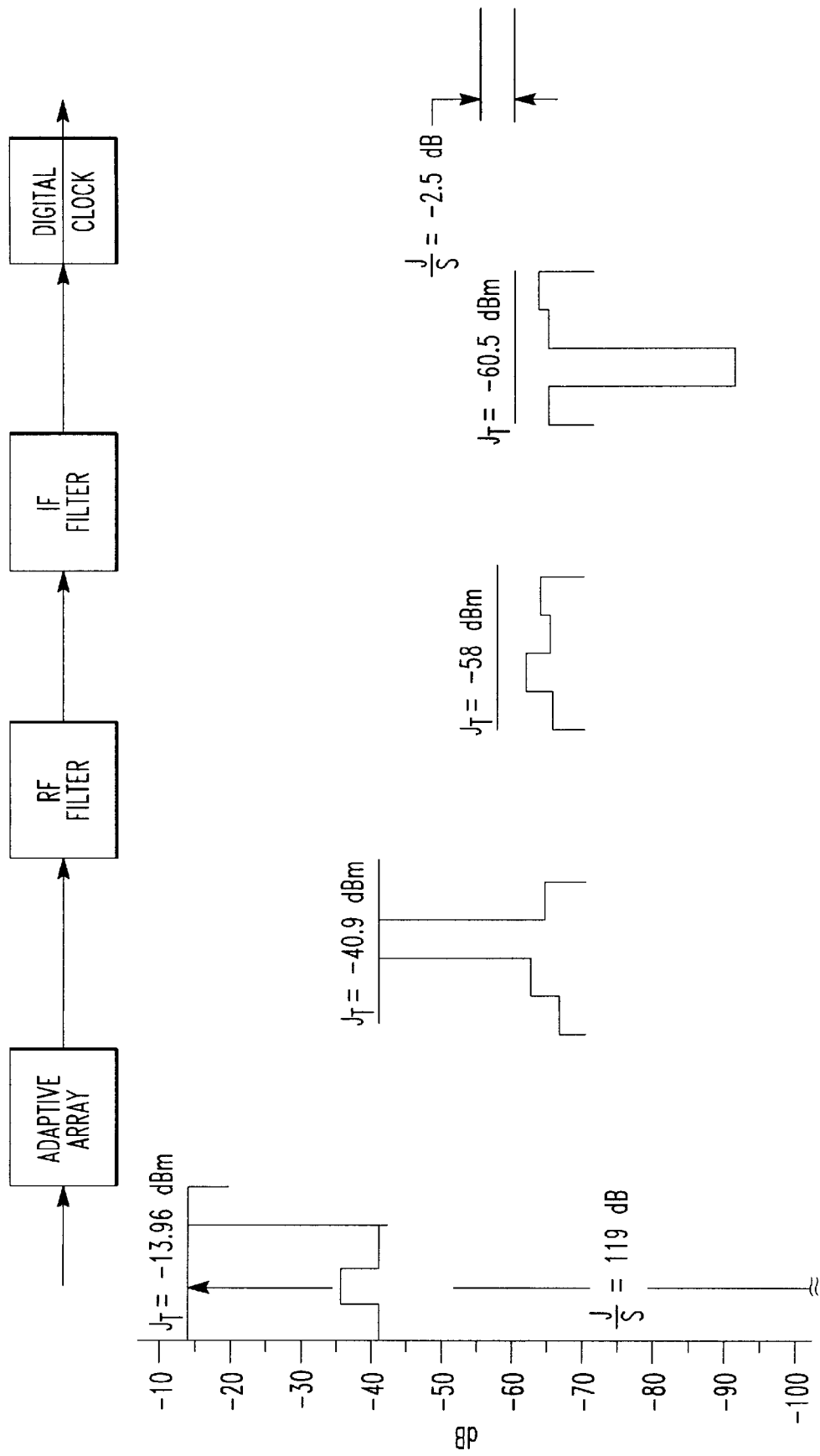
FIG. 13 graphically illustrates how the invention suppresses multiple jammer threats like those of FIG. 12.

FIG. 13 similarly illustrates the operation of the GPS receiver 50 on an airborne platform in a multiple threat scenario shown in FIG. 12. In this scenario, a blue cruise missile 150 is attacking a ground target 152 protected by extensive red jammer resources. The combined jammer signal level at the platform is approximately −14 dBm, resulting in a J/S of 119 dB. This scenario includes a very large range of threat power levels, modulation types, and geometric dispositions.

The top of FIG. 13 shows the progression of these signals through the GPS receiver 50. The bottom of FIG. 12 shows the effective satellite signal strength due to the improved digital Rx/Proc performance. For this scenario, the resultant J/S is −2.5 dB, and the GPS receiver wins, that is the GPS receiver is able to complete its mission of calculating its location.

This example shows how careful consideration needs to be given to the determination of AJ effectiveness. Here, a total suppression of 155 dB is applied to the incoming jammers to reduce the total effective J by 46.5 dB. The GPS receiver always needs much more AJ capability than can actually be applied in most scenarios in order to win.

Figure 14:
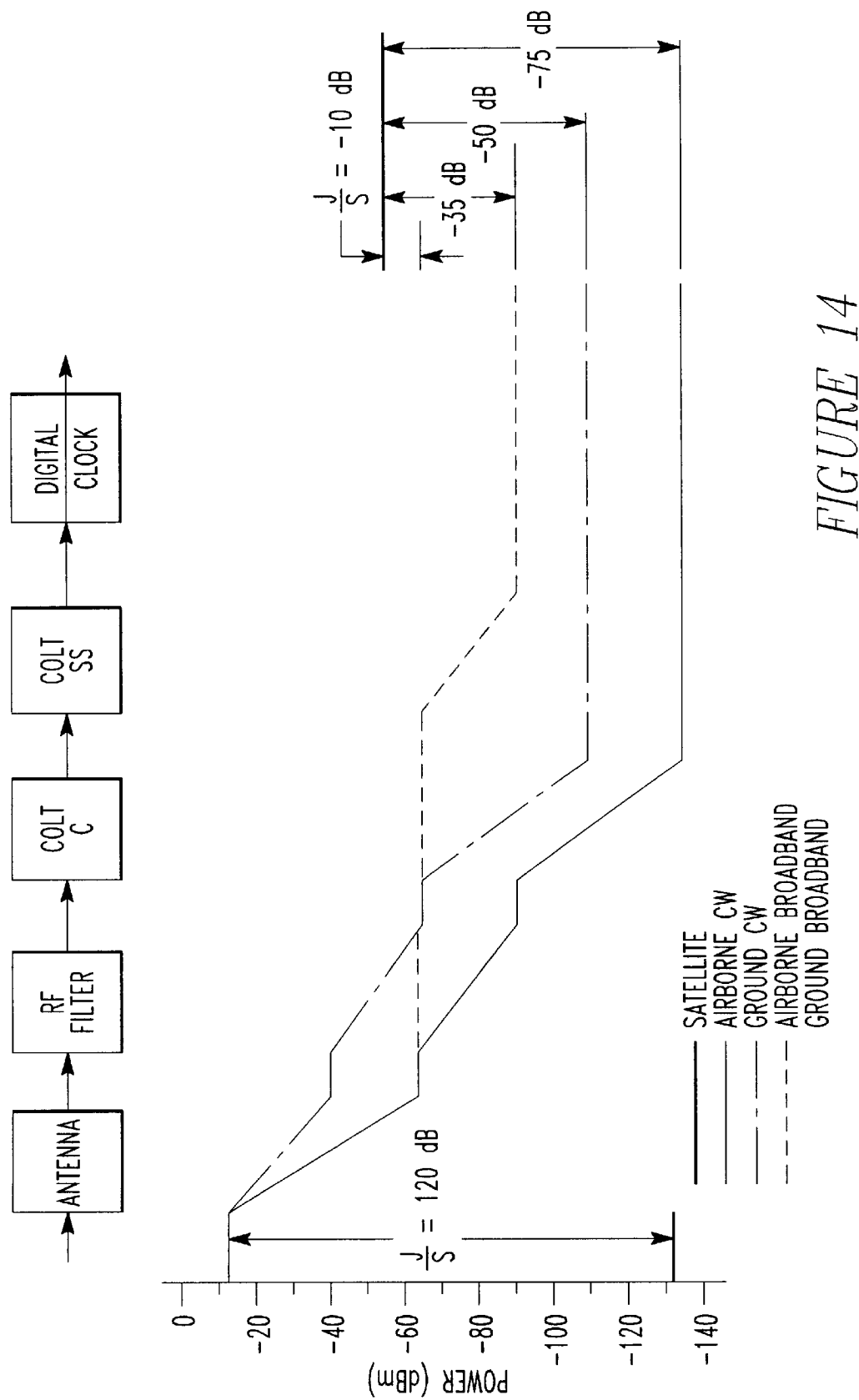
FIG. 14 graphically illustrates performance of the invention against single, high-power threats.

FIG. 14 graphically illustrates the operation of the invention, as embodied in the GPS receiver 50, against various combinations of an airborne CW threat, a ground CW threat, and airborne or ground broadband threats.

Figure 7:
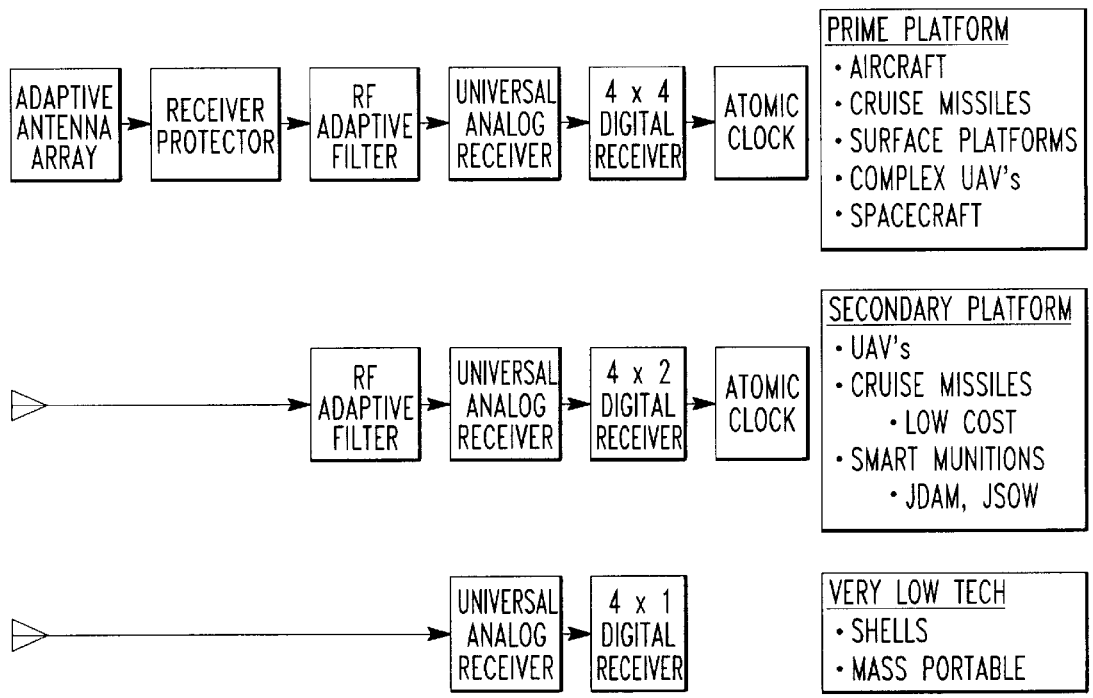
FIG. 7 illustrates three of a variety of modular configurations which can be provided in accordance with the invention to meet the anti-jam needs of different kinds of platforms.

FIG. 7 illustrates some of the ways the modular structure of the invention can be arranged to meet the needs of various applications. Prime platforms such as aircraft, cruise missiles, surface platforms, complex UAVs and spacecraft may require significant anti-jam protection. In most of these applications, all six modules are likely to be required. These platforms may require simultaneous tracking of up to 8 satellites using both L1 and L2 carrier signals. Receiver 8 of Table 3 (ahead) is an example of a receiver which was built according to this model.

Secondary platforms such as expendable UAVs, low cost cruise missiles, and smart munitions like JDAM and JSOW may require less anti-jam protection. Features like the adaptive antenna array might be replaced by a single antenna, and the receiver protector may be eliminated to reduce cost and weight. These platforms may require simultaneous tracking of only 4 satellites using both L1 and L2 carrier signals. Receiver 7 of Table 3 is an example of a receiver built according to this model.

Ultra light, low cost receivers are at the other end of the application spectrum for use in artillery shells or in man portable devices. In these cases, features like the atomic clock and the RF adaptive filter may be eliminated and simultaneous tracking of 4 satellites with the L1 carrier signal may only be required. Receiver 4 of Table 3 is an example of a receiver built according to this model.

In operation, the GPS receiver 50 provides better AJ capability at reduced cost as compared to conventional GPS receivers. The improved capability is based on better jammer suppression and better GPS satellite signal enhancement.

Table 2 summarizes the improved performance achieved with application of the invention (as compared to −40 dB AJ capability of typical prior art GPS receivers):

TABLE 2

GPS PERFORMANCE
J/S REDUCTION THROUGH A COMBINATION
OF J REDUCTION AND S ENHANCEMENT

| Threat | Function | At Capacity |
|---|---|---|
| Distributed Low Power Ground Threats | Antenna Sector Null; | 25 dB |
| High Power Noise | Antenna Adaptive Nulls; [(2) @ 25 dB | 25–50 dB |
| High Power CW | RF Filter (Notch/FSL); | 20 dB |
| Any CW | IF Filter (Colt C); | 45 dB |
| Any Broadband (PSK) | IF Filter (Colt SS); | 30 dB |
| All | A/D Improvement; (2 to 8 - bit) | 30 dB |
| All | Atomic Clock Stability; | 25 dB |

As previously indicated, the invention has application to GPS receivers as well as other RF receivers employed for global navigation purposes. These include an Electronic Support Measures (ESM) receiver 180 which is structured in accordance with the invention as shown in FIG. 15 to detect and locate jammers operating in the environment.

The ESM receiver 180 uses a non-linear array 183 of antenna elements to establish an unambiguous angle of arrival of a jammer signal. The line array antenna 183 feeds GPS receiver elements 184, 185, and 186 of the invention for detection of a GPS-like signal. The antenna 183 also feeds a processor 187 which detects time difference of arrival (TDOA) and the angle of arrival of the signal used in range determination. The ESM receiver 180 can be used as a stand alone unit synthetically determining the TDOA over a long base line based on motion of the ESM receiver 180, or it can be used with other ESM receivers to determine TDOA over a physically long base line for ESM receivers that are fixed in space. With use of an atomic clock module 189, a very accurate TDOA capability is achieved with an attendant increase in passive ranging accuracy.

Among other applications, the invention can also be embodied in anti-radiation missile seekers (ARM) as illustrated by an ARM 182 shown in FIG. 16. The missile seeker receiver uses a track array antenna 190 plus receiver modules 192, 194, and 196 of the invention to guide the seeker in on a jammer. The output of the analog receiver 194 is fed to both the digital receiver 196 and a navigation computer 198. The navigation computer 198 homes in on the jammer (HOJ) signal as long as the jammer signal is present. When the jammer signal is turned off, the navigation computer 198 flies to a fixed location based on the last known location of the jammer signal using the RF navigation signals to locate the target in space.

In summary, the invention employs a hybrid/modular structure and a diversity of anti-jamming and signal enhancement features to achieve the described improvement in performance in each of a variety of modular receiver configurations employed for global navigation purposes. As applied to AJ GPS receivers, the invention enables creation of a product line of receivers which have degrees of anti-jam capability tailored to the type of jamming environment expected and the type of platform on which it is to be deployed.

The following Table 3 illustrates the breadth of capability that can be built within a modular AJ GPS receiver architecturally structured in accordance with the invention.

The maximum J/S capacity indicated in this table is a figure of merit for the corresponding receiver example. The actual jammer performance depends on the level of signals, the spatial origin of the signals, and the types of signals (CW, AM CW, FM CW, Pulsed CW, Swept CW, BPSK, QPSK, Noise, GPS, etc.) which comprise the signal environment being sampled by the antenna and processed by the receiver. The complex interaction of these parameters with the anti-jam technology used in the GPS receiver determines the amount of jammer suppression and signal enhancement that can be physically realized. Analysis has shown that, dependent on the scenario, these receivers can realize J/S ratios of anywhere from 25 to over 120 dB.

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A radio frequency (RF) navigation receiver comprising:
   an antenna system for receiving global navigation signals;
   an analog RF system having an amplifier and a filter for amplifying and filtering an antenna output signal which includes the navigation signals and any received jammer signals;
   an analog receiver for receiving and downconverting an RF output signal from the RF system;
   the analog receiver having means for filtering by adaptive cancellation with continuous look-through operation to provide a first capability for suppressing received jammer signals; and
   a digital receiver system for receiving and converting an analog receiver output signal to generate a digital output signal for navigation control.

2. The RF navigation receiver of claim 1 wherein the filtering means further operates by adaptive cancellation to

TABLE 3

THE BREADTH OF MAXIMUM J/S CAPACITIES FOR REPRESENTATIVE MODULAR ANTI-JAM GPS RECEIVERS

| Receiver Example | C/A Code | P- Code | Atomic Clock | Dual Frequency | COLT C | COLT SS | FSL | CRPA | Number or Channels | Jammer Suppression (dB) | Processing Gain (dB) | Maximum J/S Capacity (dB) |
|---|---|---|---|---|---|---|---|---|---|---|---|---|
| 1 | X | | | | | | | | 4 | 0 | 43 | 43 |
| 2 | | X | X | | | | | | 4 | 0 | 73 | 73 |
| 3 | X | | | | X | | | | 4 | 45 | 43 | 68 |
| 4 | X | | | | X | X | | | 4 | 75 | 43 | 118 |
| 5 | | X | X | | X | | | | 4 | 45 | 73 | 118 |
| 6 | | X | X | | X | X | | | 4 | 75 | 73 | 148 |
| 7 | | X | X | | X | X | X | | 8 | 95 | 73 | 168 |
| 6 | | X | X | X | X | X | X | X | 16 | 170 | 73 | 243 |

Receiver example number 1 can be sold commercially to the non-military market. Receiver examples numbers 2 through 6 can be sold to the military for incorporation in munitions/shells and manportable units. Receiver example number 7 can be sold to the military for use in expendable UAVs, cruise missiles and smart munitions. Receiver example number 8 can be used by the military aboard high valued assets such as aircrafts, cruise missiles, surface platforms, land vehicles, complex UAVs, and satellites.

filter narrow band signals with at least 45 dB rejection to provide a first capability for suppressing received jammer signals.

3. The RF navigation receiver of claim 1 wherein the adaptive cancellation filtering means further operates to filter broadband signals with at least 30 dB rejection.

4. The RF navigation receiver of claim 2 wherein the adaptive cancellation filtering means further operates to filter broadband signals with at least 30 dB rejection.

5. The RF navigation receiver of claim 1 wherein at least one of the digital receiver, the antenna system, and the RF system has means for suppressing received jammer signals to provide a second jammer suppression capability, or the second and additional jammer suppression capabilities.

6. The RF navigation receiver of claim 5 wherein the RF system has suppressing means including at least one of a receiver protector and an adaptive RF filter operating to reject narrow-band jammer signals and thereby provide the second jammer suppression capability.

7. The RF navigation receiver of claim 5 wherein the digital system includes a wide range analog/digital converter system having at least an n×2 bit converter where n is a function of the structure of an antenna in the antenna system 10, thereby providing the second jammer suppression capability.

8. The RF navigation receiver of claim 5 wherein the digital system includes at least a phase stable oscillator generating a timing output for navigation computations with at least $1 \times 10^{-11}$ stability thereby providing the second jammer suppression capability.

9. The RF navigation receiver of claim 5 wherein the antenna system is an adaptive array antenna system which has means for nulling each of at least two detected jammer signals to provide the second jammer suppression capability.

10. The RF navigation receiver of claim 6 wherein the adaptive RF filter is a molecular level RF filter.

11. The RF navigation receiver of claim 6 wherein the digital system includes a phase stable oscillator generating a timing output for navigation computations with $1 \times 10^{-11}$ or better stability thereby providing a third jammer suppression capability.

12. The RF navigation receiver of claim 11 wherein the antenna system includes means for nulling each of at least two detected jammer signals to provide a fourth jammer suppression capability.

13. The RF navigation receiver of claim 11 wherein the digital system includes a wide range analog/digital converter system having an n×2 bit converter where n is a function of the structure of an antenna in the antenna system.

14. The RF navigation receiver of claim 1 wherein the filtering means of the analog receiver includes a first adaptive continuous look-through filter for rejecting broadband spread spectrum jammer signals and a second adaptive continuous look-through filter for rejecting narrow band jammer signals.

15. The RF navigation receiver of claim 12 wherein means are provided for detecting jammer signals in the analog receiver output signal; and a configuration managing processor is coupled to the antenna and RF systems and the analog receiver to control jammer suppression in response to the detecting means.

16. A navigation control system for a navigable platform, the control system including the RF navigation receiver of claim 1 and further comprising a navigation computer for computing navigation signals in response to the digital output signal.

17. A navigation control system for a navigable platform, the control system including the RF navigation receiver of claim 12 and further comprising a navigation computer for computing navigation signals in response to the digital output signal.

18. A radio frequency (RF) navigation receiver comprising:

an antenna system for receiving global navigation signals;

an analog RF system having an amplifier and a filter for amplifying and filtering an antenna output signal which includes the navigation signals and any received jammer signals;

an analog receiver for receiving and downconverting an RF output signal from the RF system;

at least one of the analog receiver and the analog RF system having means for signal filtering to provide a first capability for suppressing received jammer signals;

a digital receiver system for receiving and converting an analog receiver output signal to generate a digital output signal for navigation control;

at least one of the digital receiver and the antenna system having means for suppressing received jammer signals to provide a second jammer suppression capability.

19. The RF navigation receiver of claim 18 wherein the RF system has at least one of a receiver protector and an adaptive broadband RF filter operating to reject narrow-band jammer signals and thereby provide the first jammer suppression capability.

20. The RF navigation receiver of claim 18 wherein the digital system has at least a phase stable oscillator generating a timing output for navigation computations with $1 \times 10^{-11}$ or better stability thereby providing the second jammer suppression capability.

21. The RF navigation receiver of claim 20 wherein the oscillator is a cesium atomic clock.

22. The RF navigation receiver of claim 18 wherein the digital system includes an analog/digital converter system having at least an n×2 bit converter, where n is a number of antenna patches provided for the antenna system, thereby providing the second jammer suppression capability.

23. The RF navigation system of claim 19 wherein the antenna system has means for nulling each of at least two detected jammer signals to provide a third jammer suppression capability.

24. The RF navigation system of claim 23 wherein the digital system includes a phase stable oscillator generating a timing output for navigation computations with $1 \times 10^{-11}$ or better stability thereby providing a fourth jammer suppression capability.

25. The RF navigator system of claim 19 wherein the RF system has an adaptive YIG RF filter operating at a molecular level to reject narrow-band jammer signals continuous look-through filter for rejecting broadband spread spectrum jammer signals and a second adaptive continuous look-through filter for rejecting narrow band jammer signals.

26. A modular, hybrid radio frequency (RF) navigation receiver in which jammer suppression is modularly distributed, the receiver comprising:

an analog section having an antenna module, an RF module, and an analog receiver module;

a digital section having a digital receiver module including a configuration managing processor;

at least one of the analog receiver module and the RF module having means for suppressing received jammer signals to provide at least a first capability for suppressing received jammer signals;

the digital receiver receiving and converting an analog receiver output signal to generate a digital output signal for navigation control;

means for detecting jammer signals in the analog receiver output signal; and the configuration managing processor responding to the detecting means to control jammer suppression operation of at least the analog receiver module or the RF module.

27. The RF navigation receiver of claim 26 wherein the digital module has at least a phase stable oscillator generating a timing output for navigation computations with 1×10⁻¹¹ or better stability thereby providing a second jammer suppression capability.

28. The RF navigation receiver of claim 26 wherein at least one of the digital receiver and the antenna system has second means for suppressing received jammer signals to provide an additional jammer suppression capability; and the configuration managing processor is coupled to the RF module, if the RF module has a jammer suppression capability, and to the antenna module, if the antenna module has a jammer suppression capability, to control selectively RF and antenna jammer suppression operation in response to the detecting means.

29. A navigation control system for a navigable platform, the control system including the RF navigation receiver of claim 26 and further comprising a navigation computer for computing navigation signals in response to the digital output signal.

30. A method for operating a radio frequency (RF) navigation receiver, the steps of the method comprising:

receiving global navigation signals through an antenna system;

amplifying and filtering an antenna output signal, which includes the navigation signals and any received jammer signals thereby generating an RF output signal;

receiving and downconverting, with analog circuitry, the RF output signal to generate an analog receiver output signal;

filtering, by adaptive cancellation, with continuous look-through operation broadband signals from the RF output signal to provide a first capability for suppressing received jammer signals; and receiving and converting the analog receiver output signal to generate a digital output signal for navigation control.

31. The method of claim 30 wherein the steps further operate to filtering broadband signals from the RF output signal with at least 30 dB rejection and narrow band signals with at least 45 dB rejection.

32. The method of claim 30 wherein the steps further include suppressing received jammer signals in at least one of the receiving, amplifying and filtering, and receiving and downconverting steps to provide a second jammer suppression capability, or the second and additional jammer suppression capabilities.

33. The method of claim 32 wherein the steps further include at least one of protecting the RF receiver from high energy microwaves and operating a molecular level RF filter to provide the second jammer suppression capability.

34. The method of claim 32 wherein the receiving and converting steps include operating a phase stable oscillator to generate a timing output for navigation computations with 1×10⁻¹² or better stability thereby providing the second jammer suppression capability.

35. The method of claim 32 wherein the navigation signal receiving step includes operating an adaptive array antenna system to null each of at least two detected jammer signals to provide the second jammer suppression capability.

36. The method of claim 32 wherein the receiving and converting step includes responding to detected jammer signals to configure each of the receiving, amplifying and filtering, and receiving and downconverting steps which provide a jammer suppression capability.

37. A method for operating a radio frequency (RF) navigation receiver, the steps of the method comprising:

receiving global navigation signals through an antenna system;

amplifying and adaptively filtering an antenna output signal which includes the navigation signals and any received jammer signals thereby generating an RF output signal and providing a first capability for suppressing receiver jammer signals;

receiving and downconverting, with analog circuitry, the RF output signal to generate an analog receiver output signal;

receiving and converting the analog receiver output signal to generate a digital output signal for navigation control; and operating at least one of the digital receiver, the antenna system, and the RF system to provide at least a second capability for suppressing received jammer signals, or the second and additional jammer suppression capabilities.

38. The method of claim 37 wherein the steps further include adaptively filtering the RF output signal with broadband signal filtering to reject broadband spread spectrum jammer signals.

39. The method of claim 37 wherein the receiving and converting step further includes using at least an n×2 converter to convert the analog receiver output signal to digital form, wherein n is a number of antenna patches provided for the antenna system.

40. The method of claim 37 wherein the receiving and converting step further includes generating a timing output for navigation computations with 1×10⁻¹¹ or better stability.

41. The method of claim 37 wherein the amplifying and filtering step includes operating an adaptive YIG filter to reject narrow band jammer signals.

42. The method of claim 40 wherein the receiving and converting step further includes using at least an n×2 converter to convert the analog receiver output signal to digital form, wherein n is a number of antenna patches provided for the antenna system, wherein the steps further include adaptively filtering the RF output signal with broadband signal filtering to reject broadband spread spectrum jammer signals, and wherein the navigation signal receiving step includes operating an adaptive array antenna system to null each of at least two detected jammer signals to provide the second jammer suppression capability.

43. The method of claim 42 wherein the receiving and converting step includes responding to detected jammer signals to configure each of the receiving, amplifying and filtering, and receiving and downconverting steps which provide a jammer suppression capability.

44. A radio frequency (RF) navigation receiver comprising:

an antenna system for receiving global navigation signals;

an analog RF system having an amplifier and an adaptive filter for amplifying and filtering an antenna output signal, which includes the navigation signals and any received jammer signals, and for rejecting narrow-band jammer signals to provide a first jammer suppression capability;

an analog receiver for receiving and downconverting an RF output signal from the RF system; and a digital receiver system for receiving and converting an analog receiver output signal to generate a digital output signal for navigation control.

45. The RF navigation receiver of claim 44 wherein at least one of the analog and digital receivers and the antenna system has means for suppressing received jammer signals to provide an additional jammer suppression capability.

46. The RF navigation receiver of claim 44 wherein the adaptive filter is a YIG molecular level RF filter which provides a second jammer suppression capability.

47. The RF navigation receiver of claim 45 wherein the analog receiver has at least one continuous look-through filter for filtering broadband signals and a second, continuous look-through filter for filtering narrow band signals to provide the second capability for suppressing received jammer signals.

48. The RF navigation receiver of claim 47 wherein the first and second look-through filters are provided, and wherein the digital system includes a wide range analog/digital converter system having at least an n×2 bit converter where n is a function of the structure of an antenna in the antenna system 10, thereby providing a third jammer suppression capability.

49. The RF navigation receiver of claim 48 wherein the digital system includes at least a phase stable oscillator generating a timing output for navigation computations with at least $1\times10^{-11}$ stability.

50. The RF navigation receiver of claim 49 wherein the antenna system is an adaptive array antenna system which has means for nulling each of at least two detected jammer signals.

51. The RF navigation receiver of claim 50 wherein means are provided for detecting jammer signals in the analog receiver output signal; and a configuration managing processor is coupled to the antenna and RF systems and the analog receiver to control jammer suppression in response to the detecting means.

52. A method for operating a radio frequency (RF) navigation receiver, the steps of the method comprising:

receiving global navigation signals through an antenna system;

amplifying and filtering an antenna output signal which includes the navigation signals and any received jammer signals;

the amplifying and filtering step including operating an adaptive molecular level filter to reject narrow band jammer signals;

receiving and downconverting, with analog circuitry, an RF output signal; and receiving and converting an analog receiver output signal to generate a digital output signal for navigation control.

53. The method of claim 52 wherein the steps further include suppressing received jammer signals in at least one of the receiving step, the receiving and downconverting step, and the receiving and converting step to provide a second jammer suppression capability, or the second and additional jammer suppression capabilities.

54. The method of claim 53 wherein the receiving and downconverting step includes operating broadband and narrow band look-through filters to filter the RF output signal thereby providing the second jammer suppression capability.

55. The method of claim 54 wherein the receiving and converting step further includes using at least an n×2 converter to convert the analog receiver output signal to digital form, wherein n is a number of antenna patches provided for the antenna system and wherein the receiving and converting step further includes generating a timing output for navigation computations with $1\times10^{-11}$ or better stability.

56. The method of claim 55 wherein the navigation signal receiving step includes operating an adaptive array antenna system to null each of at least two detected jammer signals to provide the second jammer suppression capability.

* * * * *